(12) United States Patent
Lin et al.

(10) Patent No.: US 10,546,433 B2
(45) Date of Patent: Jan. 28, 2020

(54) METHODS, SYSTEMS, AND COMPUTER READABLE MEDIA FOR MODELING GARMENTS USING SINGLE VIEW IMAGES

(71) Applicant: The University of North Carolina at Chapel Hill, Chapel Hill, NC (US)

(72) Inventors: Ming C. Lin, Chapel Hill, NC (US); Shan Yang, Sunnyvale, CA (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 16/054,599

(22) Filed: Aug. 3, 2018

(65) Prior Publication Data

US 2019/0043269 A1 Feb. 7, 2019

Related U.S. Application Data

(60) Provisional application No. 62/540,956, filed on Aug. 3, 2017.

(51) Int. Cl.
| | |
|---|---|
| *G06T 19/20* | (2011.01) |
| *G06T 7/73* | (2017.01) |
| *G06T 17/20* | (2006.01) |
| *G06T 7/62* | (2017.01) |
| *G06K 9/00* | (2006.01) |

(52) U.S. Cl.
CPC .......... *G06T 19/20* (2013.01); *G06K 9/00362* (2013.01); *G06T 7/62* (2017.01); *G06T 7/75* (2017.01); *G06T 17/205* (2013.01); *G06T 2210/16* (2013.01); *G06T 2219/2004* (2013.01)

(58) Field of Classification Search
None
See application file for complete search history.

(56) References Cited

FOREIGN PATENT DOCUMENTS

WO  WO-2016102228 A1 * 6/2016 ............. G06T 17/00

OTHER PUBLICATIONS

Bogo et al., "Keep it SMPL: Automatic Estimation of 3D Human Pose and Shape from a Single Image", Jul. 2016, (Year: 2016).*
Guan et al., "DRAPE: Dressing any PErson", ACM, 2012. (Year: 2012).*
Ye et al., "Fitting 3D garment models onto individual human models", Elsevier, 2010 (Year: 2010).*

(Continued)

*Primary Examiner* — Nicholas R Wilson
(74) *Attorney, Agent, or Firm* — Jenkins, Wilson, Taylor & Hunt, P.A.

(57) ABSTRACT

Methods, systems, and computer readable media for modeling garments using single view images are disclosed. According to one method, the method includes receiving an image depicting a person wearing at least one garment. The method also includes constructing a body model based on the person in the image and a template from a body model database. The method further includes constructing at least one garment model based on the at least one garment in the image and at least one template from a garment model database. The method also includes constructing a combined model based on the body model and the at least one garment model. The method further includes adjusting the combined model by modifying body pose parameters and determining garment material properties and sizing parameters.

18 Claims, 18 Drawing Sheets

(56) References Cited

OTHER PUBLICATIONS

Sheffer et al., "Modeling from Contour Drawings", Eurographics, 2009. (Year: 2009).*
Li et al., "Fitness Function Optimized in Genetic Algorithm for Fabric Dynamic Simulation", IEEE, 2008. (Year: 2008).*
Redbubble. (2019). Home Page. [online] Available at: http://www.redbubble.com [Accessed Mar. 11, 2019].
Modcloth. (2019). Home Page. [online] Available at: http://www.modcloth.com [Accessed Mar. 11, 2019].
Fashionableshoes. (2019). Home Page. [online] Available at: http://www.bestfashionableshoess.blogspot.com [Accessed Mar. 11, 2019].
Boden. (2019). Home Page. [online] Available at: http://www.bodenusa.com [Accessed Mar. 11, 2019].
Anthropologie. (2019). Home Page. [online] Available at: http://www.anthropologie.com [Accessed Mar. 11, 2019].
Aliexpress. (2019). Home Page. [online] Available at: http://www.aliexpress.com [Accessed Mar. 11, 2019].
Casati et al., "Inverse Elastic Cloth Design with Contact and Friction," https://hal.archives-ouvertes.fr/hal-01309617v2, pp. 1-12 (Oct. 3, 2016).
"Global fashion industry statistics—international apparel," Fashionunite, https://web.archive.org/web/20160826110034/https://fashionunited.com/global-fashion-industry-statistics/, p. 1 (2016).
Xie et al., "Holistically-Nested Edge Detection," Proceedings of the 2015 IEEE International Conference on Computer Vision, pp. 1395-1403 (Dec. 7-13, 2015).
Chen et al., "Garment Modeling with a Depth Camera," ACM Transactions on Graphics (TOG), vol. 34, No. 6, pp. 1-12 (Nov. 2015).
Sigal et al., "A Perceptual Control Space for Garment Simulation," ACM Transactions on Graphics (TOG), vol. 34, No. 4, pp. 117:1-117:10 (Aug. 2015).
Nagano et al., "Skin Microstructure Deformation with Displacement Map Convolution," ACM Transactions on Graphics (TOG), vol. 34, No. 4, pp. 109:1-109:10 (Aug. 2015).
Lindner, "Global e-commerce sales set to grow 25% in 2015," https://www.digitalcommerce360.com/2015/07e-commerce-set-grow-25/2015/, pp. 1-6 (Jul. 29, 2015).
Jeong et al., "Garment capture from a photograph," Computer Animation and Virtual Worlds, vol. 26, No. 3-4, pp. 291-300 (May 2015).
SAACLOTHES. (2015). Home Page. [online] Available at: https://web.archive.org/web/20150404002919/http://www.saaclothes.com/ [Accessed Mar. 11, 2019].
Long et al., "Fully Convolutional Networks for Semantic Segmentation," IEEE Computer Society Conference on Computer Vision and Pattern Recognition (CVPR), pp. 3431-3440 (2015).
Yang et al., "Semantic Parametric Reshaping of Human Body Models," 2014 Second International Conference on 3D Vision, vol. 2, pp. 41-48 (Dec. 8-11, 2014).
Berard et al., "High-Quality Capture of Eyes," ACM Transactions on Graphics (TOG), vol. 33, No. 6, pp. 1-12 (Nov. 2014).
Ye et al., "Real-Time Human Pose and Shape Estimation for Virtual Try-On Using a Single Commodity Depth Camera," IEEE Transactions on Visualization and Computer Graphics, vol. 20, No. 4, pp. 550-559 (Apr. 2014).
Pinheiro et al., "Recurrent Convolutional Neural Networks for Scene Labeling," ICML'14 Proceedings of the 31st International Conference on Machine Learning, vol. 32, pp. 1-9 (Jan. 2014).
Yamaguchi et al., "Paper Doll Parsing: Retrieving Similar Styles to Parse Clothing Items," Proceedings of the 2013 IEEE International Conference on Computer Vision (ICCV), pp. 3519-3526 (Dec. 2013).
Zhou et al., "Garment Modeling from a Single Image," Computer Graphics Forum, vol. 32, No. 7, pp. 85-91 (Nov. 2013).
Chen et al., "Deformable model for estimating clothed and naked human shapes from a single image," The Visual Computer: International Journal of Computer Graphics, vol. 29, No. 11, pp. 1187-1196 (Nov. 2013).
Wu, "Towards Linear-time Incremental Structure from Motion," 3DV '13 Proceedings of the 2013 International Conference on 3D Vision, pp. 127-134 (Jul. 2013).
Cao et al., "3D Shape Regression for Real-time Facial Animation," ACM Transactions on Graphics (TOG), vol. 32, No. 4, pp. 1-10 (Jul. 2013).
Berthouzoz et al., "Parsing Sewing Patterns into 3D Garments," ACM Transactions on Graphics (TOG), vol. 32, No. 4, pp. 1-11 (Jul. 2013).
Narain et al., "Adaptive Anisotropic Remeshing for Cloth Simulation," ACM Transactions on Graphics (TOG), vol. 31, No. 6, pp. 152:1-152:10 (Nov. 2012).
Farabet et al., "Learning Hierarchical Features for Scene Labeling," IEEE Transactions on Pattern Analysis and Machine Intelligence, https://hal-upec-upem.archives-ouvertes.fr/hal-00742077, vol. 35, No. 8, pp. 1-16 (Oct. 15, 2012).
Chai et al., "Single-View Hair Modeling for Portrait Manipulation," ACM Transactions on Graphics (TOG), vol. 31, No. 4, pp. 116:1-116:8 (Jul. 2012).
Brouet et al., "Design Preserving Garment Transfer," ACM Transactions on Graphics (TOG), vol. 31, No. 4, pp. 111 (Jul. 2012).
Meng et al., "Flexible Shape Control for Automatic Resizing of Apparel Products," Computer-Aided Design, vol. 44, No. 1, pp. 1-10 (Jan. 2012).
Li et al., "Temporally Coherent Completion of Dynamic Shapes," ACM Transactions on Graphics (TOG), vol. 31, No. 1, pp. 2:1-2:11 (Jan. 2012).
Wang et al., "Data-Driven Elastic Models for Cloth: Modeling and Measurement," ACM Transactions on Graphics (TOG), vol. 30, No. 4, pp. 71:1-71:11 (Jul. 2011).
Jancosek et al., "Multi-View Reconstruction Preserving Weakly-Supported Surfaces," IEEE Computer Society Conference on Computer Vision and Pattern Recognition (CVPR), pp. 3121-3128 (Jun. 20-25, 2011).
Wu, "VisualSFM: A Visual Structure from Motion System," http://ccwu.me/vsfm/doc.html, pp. 1-10 (2011).
Robson et al., "Context-aware garment modeling from sketches," Computers and Graphics, vol. 35, No. 3, pp. 604-613 (2011).
Wang et al., "Multi-Resolution Isotropic Strain Limiting," ACM SIGGRAPH, vol. 29, No. 6, pp. 160:1-160:10 (Dec. 15-18, 2010).
Rohmer et al., "Animation Wrinkling: Augmenting Coarse Cloth Simulations with realistic-looking wrinkles," ACM Transactions on Graphics (TOG), vol. 29, No. 6, pp. 1-8 (Dec. 2010).
Zhou et al., "Parametric Reshaping of Human Bodies in Images," ACM Transactions on Graphics (TOG), vol. 29, No. 4, pp. 126:1-126:10 (Jul. 2010).
Kavan et al., "Fast and Efficient Skinning of Animated Meshes," EUROGRAPHICS 2010, vol. 29, No. 2, pp. 327-336 (May 2010).
Thomaszewski et al., "Continuum-based Strain Limiting," EUROGRAPHICS 2009, vol. 28, No. 2, pp. 569-576 (Apr. 2009).
Hasler et al., "A Statistical Model of Human Pose and Body Shape," Computer Graphics Forum, vol. 28, No. 2, pp. 337-346 (Mar. 2009).
Popa et al., "Wrinkling Captured Garments Using Space-Time Data-Driven Deformation," EUROGRAPHICS 2009, vol. 28, No. 2, pp. 427-435 (2009).
Li et al., "Global Correspondence Optimization for Non-Rigid Registration of Depth Scans," Eurographics Symposium on Geometry Processing 2008, vol. 27, No. 5, pp. 1421-1430 (Jul. 2008).
English et al., "Animating Developable Surfaces using Nonconforming Elements," ACM Transactions on Graphics (TOG), vol. 27, No. 3, pp. 1-20 (May 1, 2008).
Curtis et al., "Fast Collision Detection for Deformable Models using Representative-Triangles," Proceedings of the ACM Symposium on Interactive 3D Graphics and Games, pp. 61-69 (Feb. 15-17, 2008).
Levin et al., "A Closed-Form Solution to Natural Image Matting," IEEE Transactions on Pattern Analysis and Machine Intelligence, vol. 30, No. 2, pp. 228-242 (Feb. 2008).
Bronstein et al., "Calculus of Nonrigid Surfaces for Geometry and Texture Manipulation," IEEE Transactions on Visualization and Computer Graphics, vol. 13, No. 5, pp. 902-913 (Sep./Oct. 2007).
Goldenthal et al.,"Efficient Simulation of Inextensible Cloth," ACM Transactions on Graphics (TOG), vol. 26, No. 3, pp. 1-7 (Jul. 2007).

(56) References Cited

OTHER PUBLICATIONS

Balan et al., "Detailed Human Shape and Pose from Images," IEEE Conf. on Computer Vision and Pattern Recognition, pp. 1-8 (Jun. 2007).
Turquin et al., "A Sketch-Based Interface for Clothing Virtual Characters," IEEE Computer Graphics and Applications, vol. 27, No. 1, pp. 72-81 (Jan./Feb. 2007).
Tang et al., "ICCD: Interactive Continuous Collision Detection between Deformable Models using Connectivity-Based Culling," Journal of Latex Class Files, vol. 6, No. 1, pp. 1-14 (Jan. 2007).
Govindaraju et al., "Fast continuous collision detection among deformable models using graphics processors," Computers and Graphics, vol. 31, No. 1, pp. 5-14 (Jan. 2007).
White et al., "Capturing and Animating Occluded Cloth.," ACM Transactions on Graphics (TOG), vol. 26, No. 3, pp. 1-8 (2007).
Hasler et al., "Physically Based Tracking of Cloth," Proceedings of the 11th International Fall Workshop on Vision, Modeling, and Visualization (VMV), pp. 1-9 (Nov. 2006).
Decaudin et al., "Virtual Garments: A Fully Geometric Approach for Clothing Design," EUROGRAPHICS 2006, vol. 25, No. 3, pp. 625-634 (Sep. 2006).
Scholz et al., "Texture Replacement of Garments in Monocular Video Sequences," Eurographics Symposium on Rendering, pp. 305-312 (Jun. 26-28, 2006).
Agarwal et al., "Recovering 3D Human Pose from Monocular Images," IEEE Transactions on Pattern Analysis and Machine Intelligence, vol. 28, No. 1, pp. 44-58 (Jan. 2006).
Moeslund et al., "A survey of advances in vision-based human motion capture and analysis," Computer Vision and Image Understanding, vol. 104, No. 2-3, pp. 90-126 (2006).
Bronstein et al., "Efficient Computation of Isometry-Invariant Distances Between Surfaces," SIAM Journal on Scientific Computing, vol. 28, No. 5, pp. 1-27 (2006).
Scholz et al., "Garment Motion Capture Using Color-Coded Patterns," EUROGRAPHICS 2005, vol. 24, No. 3, pp. 439-447 (Oct. 2005).
Igarashi et al., "As-Rigid-As-Possible Shape Manipulation," ACM Transactions on Graphics (TOG), vol. 24, No. 3, pp. 1134-1141 (Jul. 2005).
Anguelov et al., "SCAPE: Shape Completion and Animation of People," ACM Transactions on Graphics (TOG), vol. 24, No. 3, pp. 408-416 (Jul. 2005).
Wang et al., "Design automation for customized apparel products," Computer-Aided Design, vol. 37, No. 7, pp. 675-691 (Jun. 2005).
Tanie et al., "High Marker Density Motion Capture by Retroreflective Mesh Suit," Proceedings of the 2005 IEEE International Conference on Robotics and Automation, pp. 2884-2889 (Apr. 18-22, 2005).
Sumner et al., "Deformation Transfer for Triangle Meshes," ACM Transactions on Graphics (TOG), vol. 23, No. 3, pp. 399-405 (Aug. 2004).
Li et al., "Lazy Snapping," ACM Transactions on Graphics (TOG), vol. 23, No. 3, pp. 303-308 (Aug. 2004).
Zhao et al., "Face Recognition: A Literature Survey," ACM Computing Surveys (CSUR), vol. 35, No. 4, pp. 399-458 (Dec. 2003).
Bridson et al., "Simulation of Clothing with Folds and Wrinkles," Eurographics/SIGGRAPH Symposium on Computer Animation, pp. 28-36 (Jul. 26-27, 2003).
Seo et al., "An Automatic Modeling of Human Bodies from Sizing Parameters," I3D Proceedings of the 2003 Symposium on Interactive 3D Graphics, pp. 1-9 (Apr. 27-30, 2003).
Bridson et al., "Robust Treatment of Collisions, Contact and Friction for Cloth Animation," ACM Transactions on Graphics (TOG), vol. 21, No. 3, pp. 594-603 (Jul. 2002).
Protopsaltou et al., "A body and garment creation method for an Internet based virtual fitting room," Advances in Modellling, Animation and Rendering, Conference Paper, pp. 1-18 (Jan. 2002).
Taylor, "Reconstruction of Articulated Objects from Point Correspondences in a Single Uncalibrated Image," Computer Vision and Image Understanding, vol. 80, No. 3, pp. 349-363 (Dec. 2000).
Volino et al., "Fast Geometrical Wrinkles on Animated Surfaces," Seventh International Conference in Central Europe on Computer Graphics and Visualization (WSCG) pp. 1-7 (1999).
Baraff et al., "Large Steps in Cloth Simulation," Proceedings of the ACM SIGGRAPH 25th Annual Conference on Computer Graphics and Interactive Techniques, pp. 43-54 (1998).
Ng et al., "Computer Graphics Techniques for Modeling Cloth," IEEE Computer Graphics and Applications , vol. 16, No. 5, pp. 28-41 (Sep. 1996).
Taubin, "A Signal Processing Approach to Fair Surface Design," SIGGRAPH '95 Proceedings of the 22nd Annual Conference on Computer Graphics and Interactive Techniques, pp. 351-358 (1995).
Kennedy et al., "Particle Swarm Optimization," IEEE, pp. 1942-1948 (1995).
Liu et al., "On the limited memory BFGS method for large scale optimization," Mathematical Programming, vol. 45, No. 1-3, pp. 503-528 (Aug. 1989).
Weil, "The Synthesis of Cloth Objects," ACM SIGGRAPH Computer Graphics, vol. 20, No. 4, pp. 49-54 (Aug. 1986).

\* cited by examiner

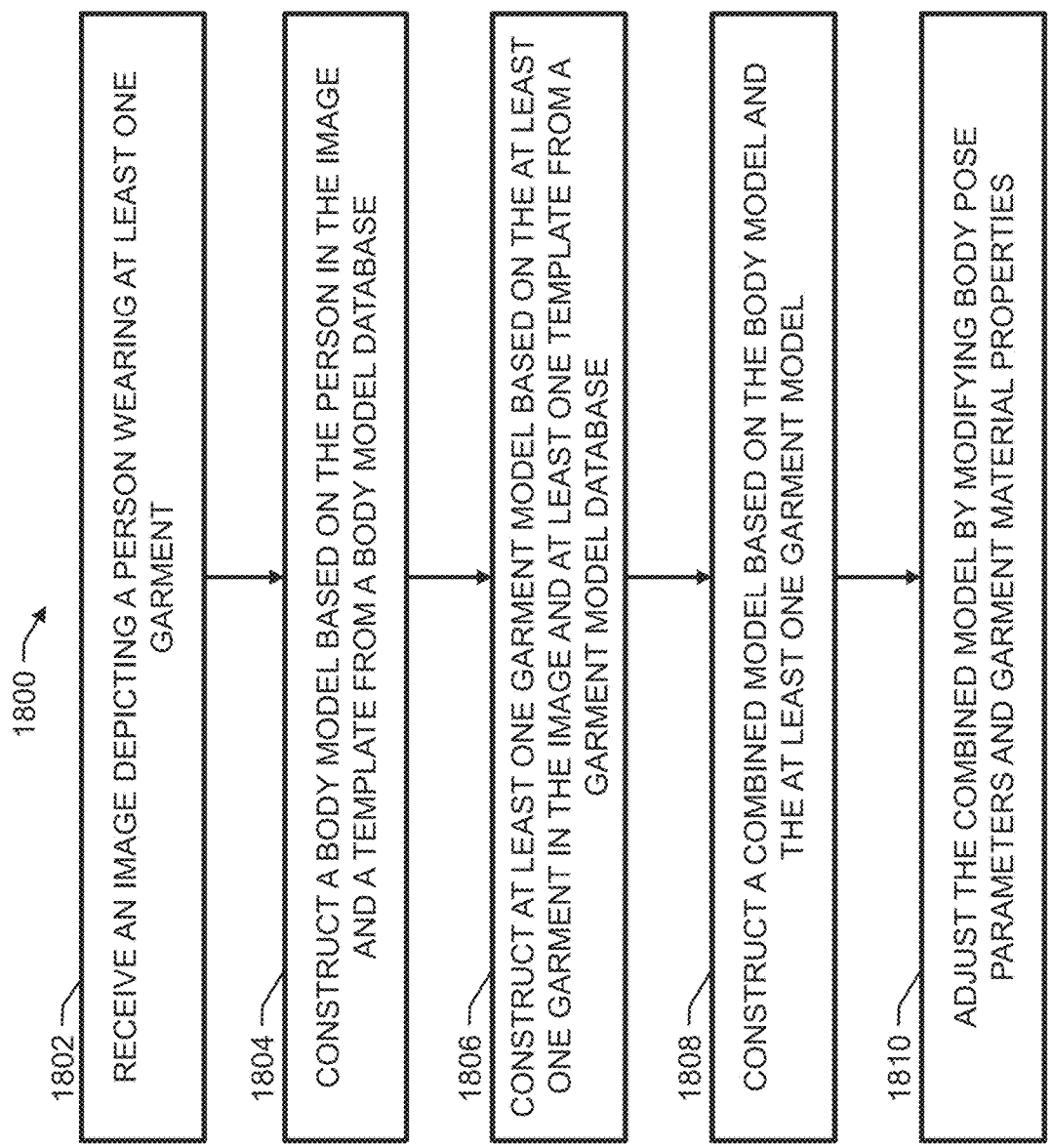

METHODS, SYSTEMS, AND COMPUTER READABLE MEDIA FOR MODELING GARMENTS USING SINGLE VIEW IMAGES

PRIORITY CLAIM

This application claims the priority benefit of U.S. Provisional Patent application Ser. No. 62/540,956, filed Aug. 3, 2017, the disclosure of which is incorporated herein by reference in its entirety.

GOVERNMENT INTEREST

This invention was made with government support under Grant Number CMMI-1547016 awarded by the National Science Foundation. The government has certain rights in the invention.

TECHNICAL FIELD

The subject matter described herein relates to virtual garment modeling for virtual try-on and rapid prototyping. More specifically, the subject matter relates to methods, systems, and computer readable media for modeling garments and fabric material extraction using single view images.

BACKGROUND

Retail is a multi-trillion-dollar business worldwide. Approximately $1.6 trillion of retail purchasing in 2015 was done via online e-commerce sales, with growth rates in the double digits. Thus, enabling better online apparel shopping experiences has the potential for enormous economic impact. Given the worldwide demand for fashion and the obvious impact of this demand on the apparel industry, technology-based solutions have recently been proposed, a few of which are already in use by commercial vendors. For example, recent garment capturing techniques generally rely on acquiring multiple views of clothing, which may not always be readily available, especially in the case of pre-existing photographs from the web.

Accordingly, there exists a need for improved methods, systems, and computer readable media for modeling garments using single view images.

SUMMARY

Methods, systems, and computer readable media for modeling garments using single view images are disclosed. According to one method, the method includes receiving an image depicting a person wearing at least one garment. The method also includes constructing a body model based on the person in the image and a template from a body model database. The method further includes constructing at least one garment model based on at least one garment in the image and at least one template from a garment model database. The method also includes constructing a combined model based on a body shape database and at least one garment model. The method further includes adjusting the combined model by modifying body pose parameters and garment material properties.

A system for modeling garments using single view images is also disclosed. The system includes a garment recovery module (GRM) implemented using at least one processor. The GRM module is configured for: receiving an image depicting a person wearing at least one garment; constructing a body model based on the person in the image and a template from a body model database; constructing at least one garment model based on at least one garment in the image and at least one template from a garment model database; constructing a combined model based on the body model and the at least one garment model; and adjusting the combined model by modifying body pose parameters associated with the body model and garment material properties associated with at least one garment model.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "node" refer to one or more physical computing platforms including one or more processors and memory.

As used herein, the term "module" refers to software in combination with hardware and/or firmware for implementing features described herein.

BRIEF DESCRIPTION OF THE DRAWINGS

FIG. 18 is a flow diagram of an example method for modeling garments using single view images.

DETAILED DESCRIPTION

Figure 1:
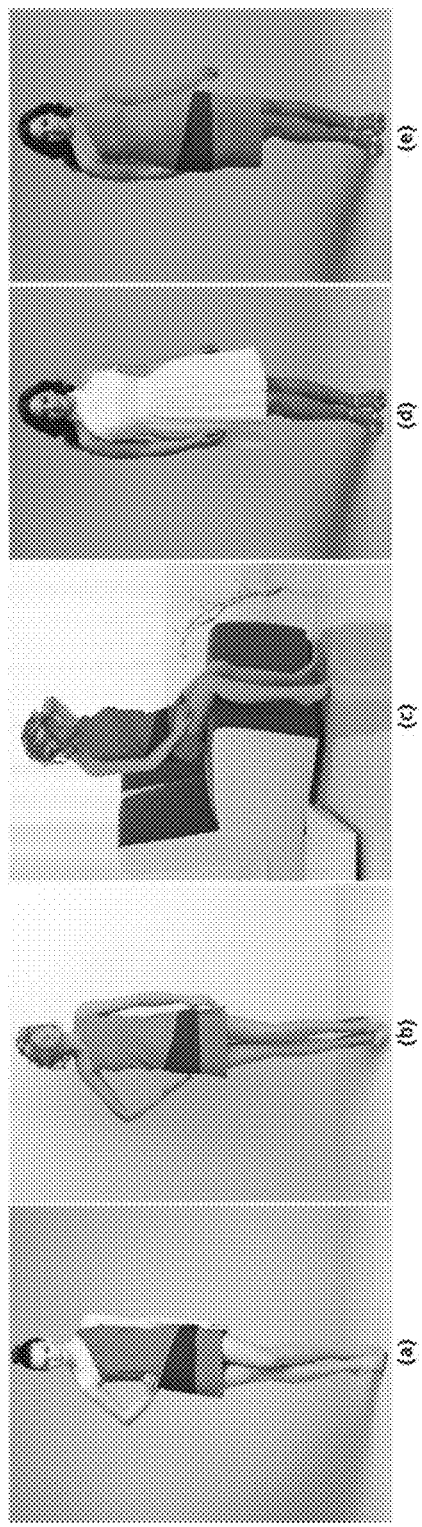
FIG. 1 shows garment recovery and re-purposing results using an example garment recovery method described herein.

The subject matter described herein related to methods, systems, and computer readable media for modeling garments using single view images.

1. Introduction

Retail is a multi-trillion dollar business worldwide, with the global fashion industry valued at $3 trillion [FashionUnited 2016]. Approximately $1.6 trillion of retail purchasing in 2015 was done via online e-commerce sales, with growth rates in the double digits [Lindner 2015]. Thus, enabling better online apparel shopping experiences has the potential for enormous economic impact. Given the worldwide demand for fashion and the obvious impact of this demand on the apparel industry, technology-based solutions have recently been proposed, a few of which are already in use by commercial vendors. For example, there are several computer-aided design (CAD) software systems developed specifically for the apparel industry. The apparel CAD industry has focused predominantly on sized cloth-pattern development, pattern-design CAD software, 3D draping preview, and automatic generation of 2D clothing patterns from 3D body scanners or other measurement devices. Some of the leading apparel CAD companies include Gerber Technology, Lectra, Optitex, Assyst, StyleCAD, Marvelous Designer, Clo-3D and Avametric, etc. Unfortunately, developing these systems requires careful and lengthy design by an apparel expert.

More recently, there have been efforts to develop virtual try-on systems, such as triMirror, that allow users to visualize what a garment might look like on themselves before purchasing. These methods enable 3D visualization of various garments, fast animation of dynamic cloth, and a quick preview of how the cloth drapes on avatars as they move around. However, the capabilities of these new systems are limited, especially in terms of ease-of-use and applicability. Many of the virtual try-on systems use simple, fast imagebased or texture-based techniques for a fixed number of avatar poses. They do not typically account for the effects on fabric materials of different conditions (e.g. changing weather, varying poses, weight fluctuation, etc.). Furthermore, almost all of these virtual try-on systems assume either that the user selects one of a pre-defined set of avatars or that accurate measurements of their own bodies have been captured via 3D scans.

In the subject matter described herein, we consider the problem of recovering detailed models of garments from a single-view image. Such a capability enables users to virtually try on garments given only a single photograph of themselves wearing clothing. Instead of representing the clothed human as a single mesh [Chen et al. 2013; Li et al. 2012], we define a separate mesh for a person's clothing, allowing us to model the rich physical interactions between clothing and the human body. This approach also helps capture occluded wrinkles in clothing that are caused by various sources, including garment design that incorporates pleats, cloth material properties that influence the drape of the fabric, and the underlying human body pose and shape.

FIG. 1 shows garment recovery and re-purposing results using an example garment recovery method described herein. In FIG. 1, image (a) shows an original image [Saaclothes2015] ©; image (b) shows a recovered dress and body shape from a single-view image; and images (c)-(e) show the recovered garment on bodies of different poses, shapes, and/or sizes [Hillsweddingdress 2015] ©.

In addition to virtual try-on applications, broader impacts in graphics include improving the accuracy of clothing models for animated characters, with the potential to further increase the visual realism of digital human models that already incorporate body-dependent priors for hair [Chai et al. 2012], face [Cao et al. 2013], skin [Nagano et al. 2015], and eyeballs [Bérard et al. 2014].

With limited input from a single-view image, we can constrain the problem's solution space by exploiting three important priors. The first prior is a statistical human body distribution model constructed from a (naked) human body data set. This statistical model is used for extracting and matching the human body shape and pose in a given input image. The second prior is a collection of all sewing patterns of various common garment types, such as skirts, pants, shorts, t-shirts, tank tops, and dresses, from a database of all garment templates. Finally, the third prior is a set of all possible configurations and dynamical states of garments governed by their respective constitutive laws and modeled by a physically-based cloth simulation. Simulation helps provide additional 3D physical constraints lacking in a 2D image.

In some embodiments, an example garment recovery method described herein proceeds as follows. To construct an accurate body model, the user indicates 14 joint positions on the image and provides a rough sketch outlining the human body silhouette. (This step can also be automated using image processing and body templates for standard unoccluded poses.) From this information, we use a statistical human model to automatically generate a human body mesh for the image. To estimate the clothing model, we first compute a semantic parse of the garments in the image to identify and localize depicted clothing items. This semantic segmentation is computed automatically using a data-driven method for clothing recognition [Yamaguchi et al. 2013]. We then use the semantic parsing to extract garment sizing information, such as waist girth, skirt length and so on, which are then used to map the depicted garments onto the existing garment templates and adjust the sewing patterns based on the extracted parameters. We also analyze the segmented garments to identify the location and density of wrinkles and folds in the recovered garments, which are usable for estimating material properties of the garments for virtual try-on. Once we have obtained both the body and clothing models, we perform an image-guided parameter identification process, which optimizes the garment template parameters based on the reconstructed human body and image information. We fit our 3D garment template's surface mesh onto the human body to obtain the initial 3D garment, and then jointly optimize the material parameters, the body shape, and the pose to obtain the final result.

Figure 2:
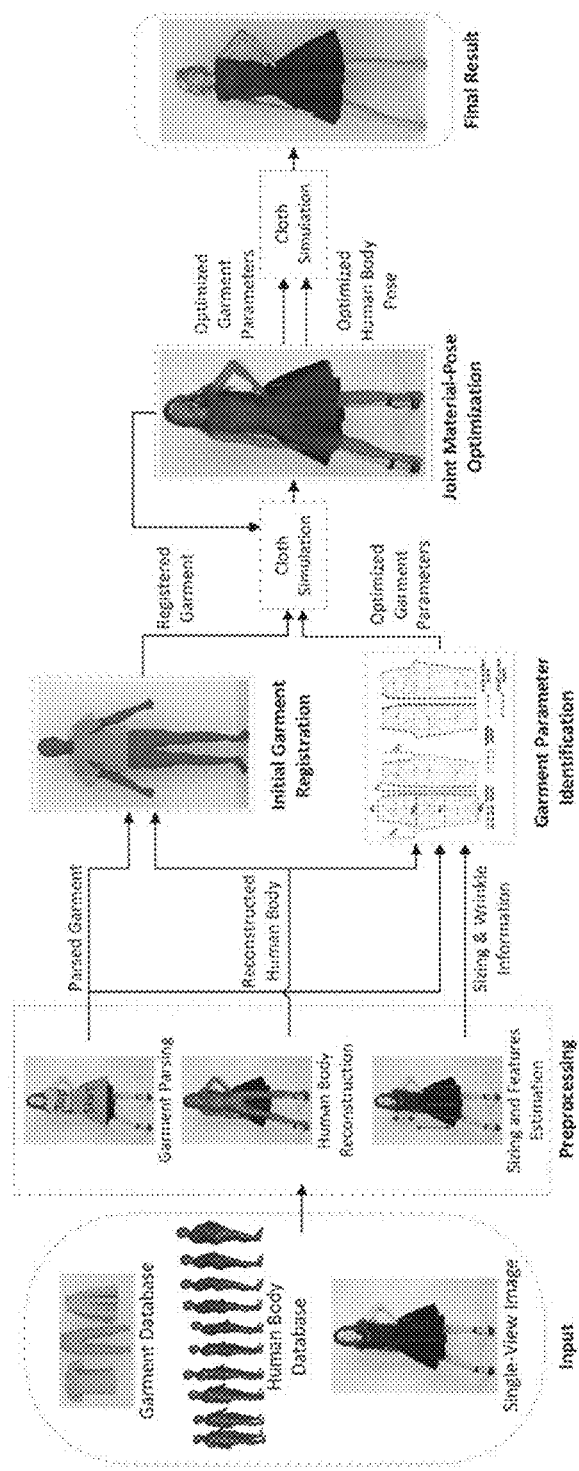
FIG. 2 depicts a flowchart representing an algorithm for an example garment recovery method described herein.

FIG. 2 depicts a flowchart representing an algorithm for an example garment recovery method described herein. In FIG. 2, a single-view image [ModCloth 2015] ©, a humanbody dataset, and a garment-template database may be input data, the input data may be processed by performing garment parsing, sizing and features estimation, and humanbody reconstruction. Next, in FIG. 2, an estimated garment may be recovered that is described by the set of garment parameters, including fabric material, design pattern parameters, sizing and wrinkle density, as well as the registered garment dressed on the reconstructed body In some embodiments, contributions of an example garment recovery method described herein may include: an image-guided garment parameter selection method that makes the generation of virtual garments with diverse styles and sizes a simple and natural task (Section 5); a joint material-pose optimization framework that can reconstruct both body and cloth models with material properties from a single image (Section 6); and an application to virtual try-on and character animation (Section 7).

2. Related Work

Cloth Modeling: Cloth simulation is a traditional research problem in computer graphics. Early work on cloth simulation includes [Weil 1986; Ng and Grimsdale 1996; Baraff and Witkin 1998; House and Breen 2000]. More recently, a number of methods were proposed to solve the complicated problems presented in cloth simulation, including collision detection [Govindaraju et al. 2007; Tang et al. 2009; Curtis et al. 2008], collision handling, friction handling [Bridson et al. 2002], strain limiting [Goldenthal et al. 2007; English and Bridson 2008; Thomaszewski et al. 2009; Wang et al. 2010] and remeshing [Narain et al. 2012].

Realistic wrinkle simulation is an important problem in realistic cloth modeling. Volino and Magnenat-Thalmann [1999] introduced a geometry-based wrinkle synthesis. Rohmer et al. [2010] presented a method to augment a coarse cloth mesh with wrinkles. Physically based cloth wrinkle simulation depends on an accurate model of the underlying constitutive law; different bending and stretching energy models for wrinkle simulation have been proposed [Bridson et al. 2003].

Garment modeling is built upon cloth simulation. It also needs to take into consideration the design and sewing pattern of the garment. Some methods start from the 2D design pattern [Protopsaltou et al. 2002; Decaudin et al. 2006; Berthouzoz et al. 2013] or 2D sketches [Turquin et al. 2007; Robson et al. 2011]. Other methods explore garment resizing and transfer from 3D template garments [Wang et al. 2005; Meng et al. 2012; Sumner and Popović 2004].

In contrast, aspects of the subject matter described herein synthesize different ideas and extend these methods to process 2D input image and fluidly transfer the results to the simulation of 3D garments. Aspects of the subject matter described herein also include functionality for editing the 2D sewing patterns with information extracted from a single-view image, which can be used to guide the generation of garments of various sizes and styles.

Human Pose and Shape Recovering: Human pose and shape recovery from a single-view image has been extensively studied in computer vision and computer graphics. Taylor [2000] presented an articulated-body skeleton recovery algorithm from a single-view image with limited user input. Agarwal et al. [2006] proposed a learning-based method to recover human body poses from monocular images. Ye et al. [2014] applied a template-based method for real-time single RGBD image human pose and shape estimation. We refer readers to this survey on human motion recovery and analysis [Moeslund et al. 2006].

Human pose and shape recovery in computer graphics focus primarily on reconstructing muscle accurately and on watertight 3D human body meshes. A realistic 3D human body mesh is the basis for character animation. A human body mesh may be required for the recovery of clothing with rich details. For human body mesh generation, we follow some previous data-driven methods, most of which are principal component analysis (PCA) based. These techniques use a set of bases to generate a variety of human bodies of different poses and shapes. Seo and Thalmann [2003] presented a method to construct human body meshes of different shapes. Following Seo and Thalmann [2003], Anguelov et al. [2005] introduced the SCAPE model, which can produce human body meshes of different poses and shapes. Using the SCAPE model, Balan et al. [2007] presented a method to recover detailed human shape and pose from images. Hasler et al. [2009] encode both human body shapes and poses using PCA and semantic parameters. Building upon these previous models, Zhou et al. [2010] proposed a method to recover the human body pose and shape from a single-view image.

Clothing Capturing: In the last decade, many methods have been proposed for capturing clothing from images or videos. Methods can be divided into two categories: marker-based and marker-less. Most marker-based clothing capture methods require the markers to have been pre-printed on the surface of the cloth. Different kinds of markers have been used for the capture [Scholz and Magnor 2006; Hasler et al. 2006; Tanie et al. 2005; Scholz et al. 2005; White et al. 2007]. Markerless methods, which do not require pre-printed clothing markers, can be characterized into several categories of methods: single-view [Zhou et al. 2013; Jeong et al. 2015], depth camera based [Chen et al. 2015]; and multi-view methods [Popa et al. 2009]. Another method based on cloth contact friction design was proposed by Casati et. al. [2016].

These methods have some limitations, however, including inability to capture fine garment details and material properties, the loss of the original garment design, and complexity of the capturing process.

In contrast, an example garment recovery method described herein and/or related techniques or algorithms can retrieve the 2D design pattern with the individual measurements obtained directly from a single image. Using a joint human pose and clothing optimization method, an example garment recovery method described herein and/or related techniques or algorithms can recover realistic garment models with details (e.g. wrinkles and folds) and material properties.

Semantic Parsing: Semantic parsing is a well-studied problem in computer vision, where the goal is to assign a semantic label to every pixel in an image. Most prior work has focused on parsing general scene images [Long et al. 2015; Farabet et al. 2013; Pinheiro and Collobert 2014]. We work on the somewhat more constrained problem of parsing clothing in an image. To obtain a semantic parse of the clothing depicted in an image, we make use of the data-driven approach by Yamaguchi et al. [2013]. This method automatically estimates the human body pose from a 2D image, extracts a visual representation of the clothing the person is wearing, and then visually matches the outfit to a large database of clothing items to compute a clothing parse of the query image.

3. Problem Statement and Assumptions

In this section, we give the formal definition of the problem. The input to our system is an RGB image $\Omega$. We assume the image is comprised of three parts: the background region $\Omega_b$, the foreground naked human body parts $\Omega_h$, and the foreground garment $\Omega_g$, where $\Omega = \Omega_b \cup \Omega_h \cup \Omega_g$. In addition, we assume that both the human body and the garment are in a statically stable physical state. Although this assumption precludes images capturing a fast moving human, it provides a crucial assumption for our joint optimization algorithm.

Problem: Given $\Omega_g$, $\Omega_h$, how to recover
  the garment described by a set of parameters $<C, \mathcal{G}, U, V>$,
    along with a set of parameters $<<\theta, z>$ that encode human body pose and shape obtained from the image.

Garment: For the clothing parameters, $C$ is the set of material parameters including stretching stiffness and bending stiffness coefficients; U is the 2D triangle mesh representing the garment's pattern pieces; and V is the 3D triangle mesh representation of the garment. For each triangle of the 3D garment mesh V, there is a corresponding one in the 2D space U. For each mesh vertex $x \in V$, such as those lying on a stitching seam in the garment, there might be multiple corresponding 2D vertices $u \in U$. The parameter $\mathcal{G}$ is the set of parameters that defines the dimensions of the 2D pattern pieces. We adopt the garment sizing parameters based on classic sewing patterns [Barnfield 2012] shown in images (a), (c), and (e) of FIG. 3, with the corresponding parameters defined in images (b), (d), and (f) of FIG. 3, respectively.

For example, we define the parameter $\mathcal{G}_{pants} = <w_1, w_2, w_3, w_4, h_1, h_2, h_3>$ for pants, where the first four parameters define the waist, bottom, knee and ankle girth and the last three parameters indicate the total length, back upper, and front upper length. For each basic garment category, we can manually define this set of parameters $\mathcal{G}$. By manipulating the values of the parameters $\mathcal{G}$, garments of different styles and sizes can be modeled: capri pants vs. full-length pants, or tight-fitting vs. loose and flowy silhouettes. We use the material model developed by Wang et al. [2011]. The material parameters $C$ are the 18 bending and 24 stretching parameters.

Human Body: For the human body parameters, $\theta$ is the set of joint angles that together parameterize the body pose, and z is the set of semantic parameters that describe the body shape. We follow the PCA encoding of the human body shape presented in [Hasler et al. 2009]. The semantic parameters include gender, height, weight, muscle percentage, breast girth, waist girth, hip girth, thigh girth, calf girth, shoulder height, and leg length.

Table I provides a list of formal definitions for the notation used herein.

TABLE I

Notation and definition of our method.

| NOTATION | DEFINITION |
| --- | --- |
| $C$ | material property parameters of the garment |
| $\mathcal{G}$ | garment (sizing) parameters |
| $\mathcal{G}_{pants}$ | $<w_1, w_2, w_3, w_4, h_1, h_2, h_3>$ |
| $\mathcal{G}_{skirt}$ | $<l_1, r_1, r_2, \alpha>$ |
| $\mathcal{G}_{w,p}$ | $<r, w_1, w_2, h_1, h_2, l_1>$ |
| U | 2D triangle mesh representing garment pattern |
| u | vertex of the 2D garment pattern mesh |
| V | 3D triangle surface mesh of the garment |
| $\mathcal{V}$ | simulated 3D triangle surface mesh of the garment |
| $B_{body}$ | skeleton of 3D human body mesh |
| $B_{garment}$ | skeleton of 3D garment mesh |
| x | vertex of the 3D triangle mesh |
| $\mathcal{P}$ | average wrinkle density of the 2D segmented garment in the image |
| k | bending stiffness parameters |
| w | stretching stiffness parameters |
| F | deformation gradient of the deforming garment |
| $\mathcal{K}$ | garment 3D mesh curvature measurement |
| $\mathcal{S}$ | 2D garment silhouette |
| $\Psi$ | bending energy of the garment |
| $\Phi$ | stretching energy of the garment |
| $v_{ij}$ | rigging weights of the 3D garment mesh |

TABLE I-continued

Notation and definition of our method.

| NOTATION | DEFINITION |
| --- | --- |
| $\beta$ | joint angles of the skeleton of the 3D garment mesh |
| $\theta$ | joint angles of the human body mesh |
| z | semantic parameters of the human boy mesh shape |
| p | vertex of the 3D human body mesh |
| P | 3D human body mesh |
| $Z_i$ | PCA basis of human body shape |
| $\omega_i$ | rigging weights of the human body mesh |
| $\mathcal{D}_c$ | garment database |
| $\mathcal{D}_h$ | human body database |

4. Data Preparation

This section describes a data preprocessing step of an example garment recovery method described herein. We begin with the data representations for the garment and the human body, followed by a brief description of each preprocessing module.

4.1 Data Representations

The garment template database can be represented as a set $\mathcal{L}_c = \{<C_i, \mathcal{G}_i, U_i, V_i, B_{garment,i}> | i \in 1, \ldots, N\}$, where N is the number of garment templates. Each garment template consists of a 2D triangle mesh U representing the sewing pattern, a 3D mesh V, a set of dimension parameters $\mathcal{G}$ for each pattern piece, the skeleton $B_{garment}$, and a set of material parameters $C$. The human body template database $\mathcal{L}_h = \{<\theta_j, z_j, B_{body,j}> | j \in 1, \ldots, M\}$ consists of M naked human body meshes with point to point correspondence. We use several human body datasets, including the SCAPE dataset [Anguelov et al. 2005], the SPRING dataset [Yang et al. 2014], the TOSCA dataset [Bronstein et al. 2008; Young et al. 2007; Bronstein et al. 2006], and the dataset from [Hasler et al. 2009]. Our garment template is defined in the same metric system as the human template to scale the garments during the initial registration. Each garment template and human template is rigged on a common skeleton with the same set of joints.

Parameterized Garment Model: Given the garment template database $\mathcal{L}_c$, each vertex u of the 2D garment pattern mesh is computed as $$u(\mathcal{G}) = \sum_{i, g_i \in \mathcal{G}}^{|\mathcal{G}|} v_i(u^0 + g_i), \quad (1)$$

with $g_i$ as the $i^{th}$ 2D pattern sizing parameter in the set $\mathcal{G}$, $v_i$ is the weight associated with the vertex u and $u^0$ is the vertex position of the 2D garment pattern template.

Parameterized Human Model: Given the body database $\mathcal{L}_h$, we extract a statistical shape model for human bodies. Under this model, each world space vertex position p on the human body is parameterized as $$p(\theta, z) = \sum_{i}^{|B_{body}|} \omega_i \mathcal{T}_{\mathcal{B}_i}(\theta)(p^0 + Z_i z), \quad (2)$$

which is a composition of a linear blend skinning model [Kavan et al. 2010] and an active shape model [Zhao et al. 2003]. Here $\omega_i$ and $\mathcal{B}_i$ are the set of weights and bones associated with the vertex p. $\mathcal{T}_\mathcal{B}$ is the transformation matrix of bone $\mathcal{B}_i$. $p^0$ and $Z_i$ are the mean shape and active shape basis at the rest pose, respectively. The basis $Z_i$ is calculated by running PCA [Hasler et al. 2009] on $\mathcal{L}_h$.

4.2 Preprocessing

Our preprocessing step consists of: a) human body reconstruction to recover the human body shape and pose from the input image, b) garment parsing to estimate the locations and types of garments depicted in the image, and c) parameter estimation to compute the sizing and fine features of the parsed garments.

Human Body Reconstruction: Our human body recovery relies on limited user input. The user helps us identify the 14 human body joints and the human body silhouette. With the identified joints, a human body skeleton is recovered using the method presented in [Taylor 2000]: the semantic parameters z are optimized to match the silhouette. In this step, we ignore the camera scaling factor.

Figure 3:
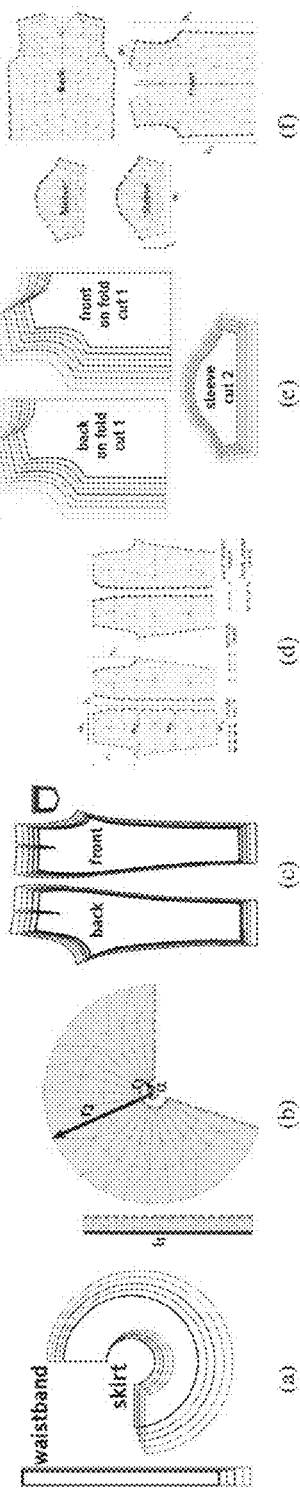
FIG. 3 shows a template sewing pattern and parameter space of a skirt, pants, and a t-shirt.

FIG. 3 shows a template sewing pattern and parameter space of a skirt, pants, and a t-shirt. In FIG. 3, image (a) depicts a classic circle sewing pattern of a skirt; image (b) depicts our parametric skirt template showing dashed lines for seams and the four parameters $<l_1, r_1, r_2, \alpha>$, in which parameter $l_1$ is related to the waist girth and parameter $r_2$ is related to the length of the skirt; image (c) depicts a classic pants sewing pattern; image (d) depicts our parametric pants template with seven parameters $<w_1, w_1, w_1, w_1, h_1, h_2, h_3>$; image (e) depicts a classic t-shirt sewing pattern; and image (f) depicts our parametric t-shirt template with six parameters $<r, w_1, w_2, h_1, h_2, l_1>$.

Garment Parsing: In some embodiments, two options may be used for garment parsing. The first uses the automatic computer vision technique presented in [Yamaguchi et al. 2013]. This approach combines global pre-trained parse models with local models learned from nearest neighbors and transferred parse masks to estimate the types of garments and their locations on the person. The second option may require assistance from the user. Given the image $\Omega$, we extract the clothing regions $\Omega_{b,h,g}$ by performing a two-stage image segmentation guided by user sketch. In the first stage, a coarse region boundary is extracted using a graph cut algorithm [Li et al. 2004]. Then, the region is refined via re-clustering [Levin et al. 2008].

Image Information Extraction: Given the segmentation of the garment $\Omega_g$, the next step is to convert it to pixel-level garment silhouette $\mathcal{S}$ and compute the average wrinkle density $\mathcal{P}$. Instead of using the wrinkle density for each part of the garment, the average wrinkle density encodes the overall material properties of it. We extract the average wrinkle density $\mathcal{P}$ from the garment images using an improved implementation of [Popa et al. 2009]. We first detect edges using Holistically-Nested edge detection [Xie and Tu 2015] and then smooth the edges by fitting them to low-curvature quadrics. We smooth edges split during the detection phase by merging those that have nearby endpoints and similar orientations. Finally, we form 2D folds by matching parallel edges. Edges not part of a pair are unlikely to contribute to a fold and are discarded. The average number of wrinkles per area is the average wrinkle density $\mathcal{P}$.

4.3 Initial Garment Registration

Figure 4:
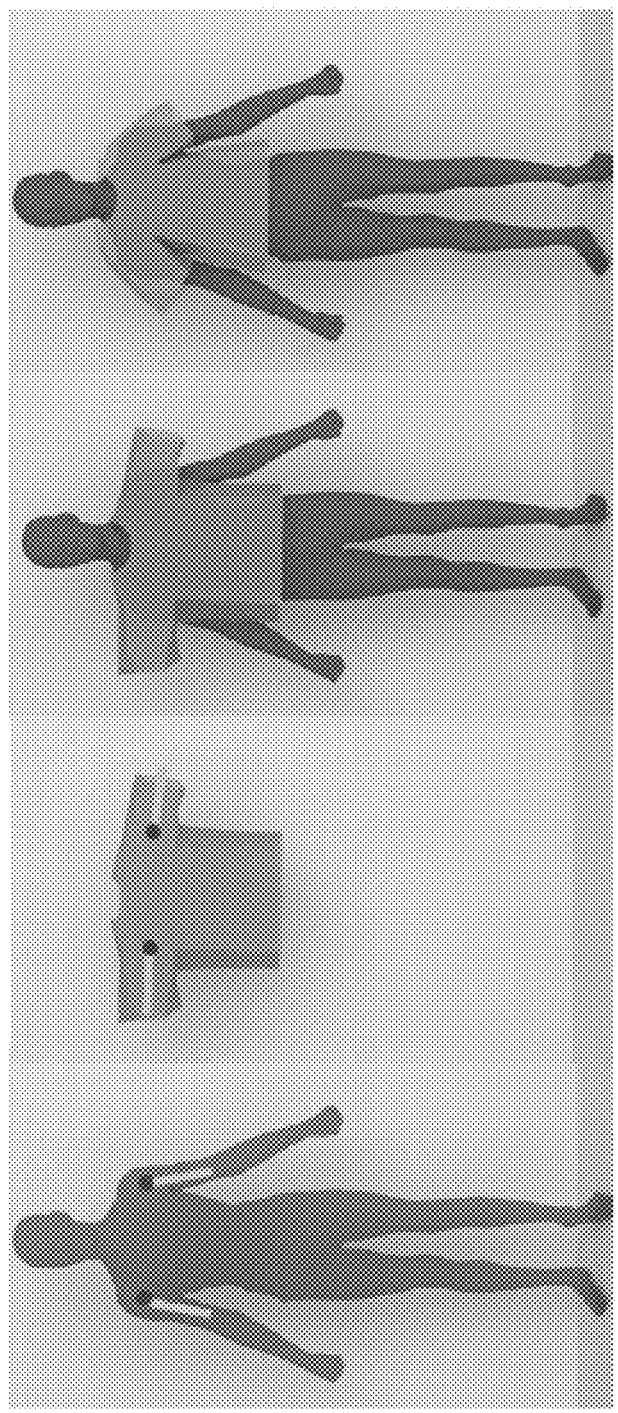
FIG. 4 shows an example initial garment registration process.

FIG. 4 shows an example initial garment registration process. In FIG. 4, image (a) depicts a human body mesh with skeleton joints shown as spheres and the skeleton of the arm shown as cylinders; image (b) depicts an initial t-shirt with the skeleton joints shown as the spheres and the skeleton in the sleeves shown as the cylinders; image (c) depicts the t-shirt and the human body mesh being aligned by matching the joints; and image (d) depicts the result after aligning the skeleton and removing the interpenetrations.

In some embodiments, an initial clothing registration step may aim to dress our template garment onto a human body mesh of any pose or shape. We can optimize the vertex positions of the 3D mesh, x, of the template clothing based on the human body mesh parameters $<\theta, z>$. In this step, we ignore the fit of the clothing on the human body (this step is intended to fix the 2D triangle mesh U). We follow the method proposed in [Brouet et al. 2012] for registering a template garment to a human body mesh with a different shape. However, their method is unable to fit the clothing to human meshes with varying poses; we extend their approach by adding two additional steps.

The first step may require the alignment of the joints $Q_c$ of the template garment skeleton with the joints $Q_h$ of the human body mesh skeleton, as shown in FIG. 4. Each joint $q \in Q_c$ of the garment has one corresponding joint $t \in Q_h$ of the human body mesh. We denote the number of joints of the garment as $K_c$. This step is done by applying a rigid body transformation matrix T on the joint of the garment, where T minimizes the objective function $$\sum_{i=0, q_i \in Q_c, t_i \in Q_h}^{K_c} \|Tq_i - t_i\|^2 \tag{3}$$

Next, we need to fit this transformed 3D template garment mesh onto the human body mesh with pose described by parameter $\theta$, the vector of the angles of the joints. Our template garment is then deformed according to $\theta$. We denote the vector $\beta$ as the joint angles of the template garment mesh. We set the value of the vector $\beta_i$ to the value of the corresponding joint angle $\theta_i$ of the human body mesh. Then we compute the 3D garment template mesh such that it matches the pose of the underlying human body mesh according to this set of joint angles $\beta$ by, $$x_i(\beta) = \sum_j v_{ij} T_{\mathcal{B}_j}(\beta) x^0, \tag{4}$$

where $v_{ij}$ is the weight of bone $\mathcal{B}_j$ on vertex $x_i$ and $T_{\mathcal{B}_j}$ is the transformation matrix of the bone $\mathcal{B}_j$. An example result is shown in image (c) of FIG. 4.

The final step is to remove collisions between the garment surface mesh and the human body mesh. This step is similar to the ICP algorithm proposed by Li et al. [2008]. We introduce two constraints: rigidity and non-interception. The deformation of the clothing should be as-rigid-as-possible [Igarashi et al. 2005]. After this step, we have an initial registered garment with a 3D mesh $\hat{V}(T, \theta)$ that matches the underlying human pose and is free of interpenetrations with the human body.

Figure 5:
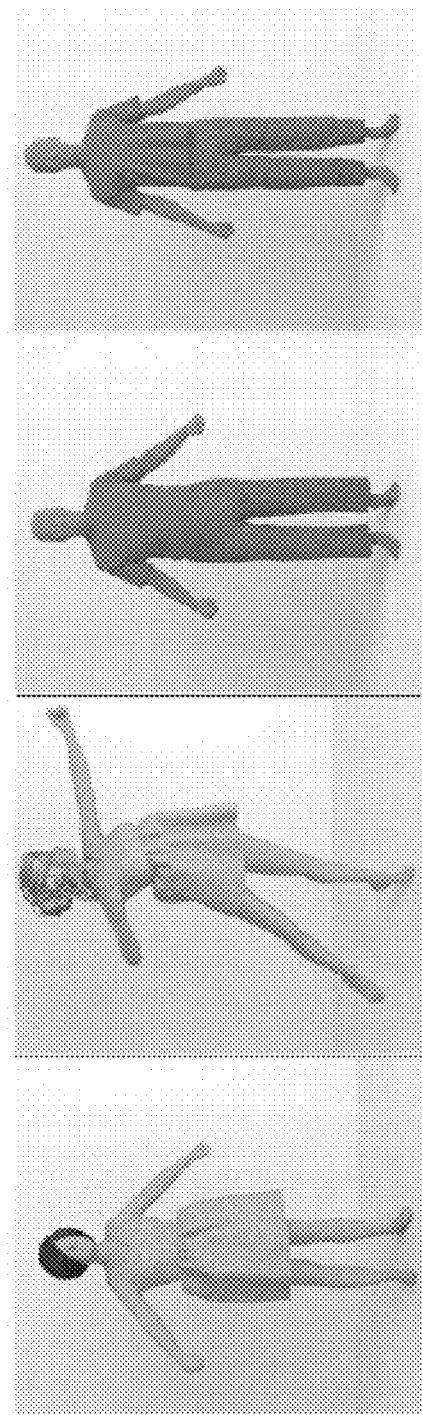
FIG. 5 shows example initial garment registration results.

FIG. 5 shows example initial garment registration results. In FIG. 5, garments are depicted on various human body models with different body shapes and poses.

5. Image-Guided Parameter Identification

In this section, we explain an example step-by-step process of extracting garment material and sizing parameters $<\mathcal{C}, \mathcal{G}>$ from an image.

5.1 Overview

Starting from our 2D triangle mesh U of the pattern pieces, we select garment parameters based on the sizing and detailed information $<S, \mathcal{P}>$ estimated from the source image. In this step, we adjust the garment material and sizing parameters $<C, \mathcal{G}>$ but fix the 3D mesh $\hat{V}(T, \theta)$ (computed from Sec. 4.3) to obtain the garment that best matches the one shown in the image. We need two specific pieces of information from the image: the pixel-level garment silhouette $S$ and the average wrinkle density $\mathcal{P}$ of the clothing. For example, for a skirt, we need to estimate the waist girth and the length of the skirt from the image.

Using this information, we initialize the garment sizing parameters $\mathcal{G}$. Based on the wrinkle information computed from the image, we optimize both the fabric material parameters $C$ and the sizing parameters of the garment pattern $\mathcal{G}$.

5.2 Garment Types, Patterns, and Parameters

For basic garment types, such as skirts, pants, t-shirts, and tank tops, we use one template pattern for each. We modify the classic sewing pattern according to the parameters $\mathcal{G}$. By adjusting the garment parameters $\mathcal{G}$ and fabric material parameters $C$, we recover basic garments of different styles and sizes. The classic circle skirt sewing pattern is shown in image (a) of FIG. 3. Our parametric space, which is morphed from this circle sewing pattern, is shown in image (b) of FIG. 3. For the skirt pattern, there are four parameters to optimize: $\mathcal{G}_{skirt} = <l_1, r_1, r_2, \alpha>$. The ratio between the parameter $l_1$ and $r_2$ is constrained by the waist girth and skirt length information extracted from the image. The other two parameters, $r_1$ and $\alpha$, are constrained by the wrinkle density. With different garment parameters, skirts can vary from long to short, stiff to soft, and can incorporate more or fewer pleats, enabling us to model a wide variety of skirts from a single design template.

Similarly for pants, the classic sewing pattern and our template pattern pieces are shown in images (c) and (d) of FIG. 3. There are seven parameters for the dimensions of the pants template: $\mathcal{G}_{pants} = <w_1, w_2, w_3, w_4, h_1, h_2, h_3>$ with the first four parameters describing the waist, bottom, knee, and ankle girth, and the last three parameters representing the total, back-upper and front-upper lengths. The t-shirt sewing pattern is shown in image (e) of FIG. 3, and our parametric t-shirt pattern is shown in image (f) of FIG. 3 with the garment parameters $\mathcal{G}_{tshirt} = <r, w_1, w_2, h_1, h_2, l_1>$. Among the parameters $\mathcal{G}_{tshirt}$, parameter $r$ describes the neckline radius, $w_1$ describes the sleeve width, $w_2$ describes the shoulder width, $h_1$ describes the bottom length, $h_2$ describes the total length, and $l_1$ describes the length of the sleeve.

Different sewing patterns result in very different garments. Traditional sewing techniques form skirt wrinkles by cutting the circular portion of the pattern. To simulate this process but make it generally applicable, we modify the parameter $\mathcal{G}$, which achieves the same effect. In addition to the differences created by sewing patterns, professional garment designers also take advantage of cloth material properties to produce different styles of clothing. We tune the bending stiffness coefficients and stretching stiffness coefficients in $C$ to simulate this cloth selection process.

5.3 From Wrinkle Density to Material Property

In some embodiments, fabric materials may be identified based on wrinkles and folds since different fabric stiffness produce varying wrinkle/folding patterns. We characterize the wrinkles and folds using their local curvatures. The first step is to map the wrinkle density $\mathcal{P}$ (computed in Sec. 4.2) to the average local curvature $\mathcal{K}$.

We recover the garment material parameter $C'$ by minimizing the average local curvature differences between our recovered garment $\mathcal{K}(C, \mathcal{G})$ and the reference garment $\mathcal{K}(\mathcal{P})_{target}$ $$C' = \underset{C}{\operatorname{argmin}} \|\mathcal{K}(C, \mathcal{G}) - \mathcal{K}(\mathcal{P})_{target}\|^2, \quad (5)$$

The reference garment average local curvature $\mathcal{K}(\mathcal{P})_{target}$ is computed by linear interpolation. We first approximate the average local curvature threshold for the sharp wrinkles and smooth folds. The average local curvature threshold for one sharp wrinkle is up to $10^5$ m$^{-1}$ and that for smooth folds is close to $10^{-4}$ m$^{-1}$. Sharp wrinkles or large folds are determined by the density of the extracted 2D wrinkles. The density of the extracted 2D wrinkles ranges from 1 m$^{-2}$ to 50 m$^{-2}$ based on our observation. The interpolation process (with the linear interpolation function $\mathcal{I}$) is $$\mathcal{K}(\mathcal{P})_{target} = \mathcal{I}(\mathcal{P}), \quad (6)$$

with the linear interpolation function $I(1) = 10^{-4}$ and $I(50) = 10^5$. Local curvature estimation of $\kappa$ at each vertex is computed based on the bending between the two neighboring triangles sharing the same edge. For each vertex x of the two triangles that share an edge e, the local curvature $\kappa$ is computed following the approach from Wang et al. [2011] and Bridson et al.

$$\kappa = \|\sin(\alpha/2)(h_1 + h_2)^{-1}|e|z\|, \quad (7)$$

where $h_1$ and $h_2$ are the heights of the two triangles that share the edge e and $\alpha$ is the supplementary angle to the dihedral angle between the two triangles. The corresponding bending force $f_{bend}$ for each vertex x is computed as $$f_{bend} = k \sin(\alpha/2)(h_1 + h_2)^{-1}|e|x, \quad (8)$$

where k is the bending stiffness coefficient.

Stretching also affects the formation of wrinkles. Each triangle $<u_0, u_1, u_2>$ in the 2D template mesh is represented as $$D_m = \begin{bmatrix} u_1 - u_0 \\ u_2 - u_0 \end{bmatrix},$$

and each triangle in the 3D garment mesh $<x_0, x_1, x_2>$ is represented as $$d_m = \begin{bmatrix} x_1 - x_0 \\ x_2 - x_0 \end{bmatrix}.$$

The stretching forces $f_{stretch}$ are computed by differentiating the stretching energy $\Psi$, which depends on the stretching stiffness parameter w, the deformation gradient $F = d_m D_m^{-1}$, and the Green strain tensor $G = \frac{1}{2}(F^T F - I)$ against the vertex 3D position x $$f_{stretch} = \frac{\partial \Psi(w, F)}{\partial x}. \quad (9)$$

The sizing and style of the garment described by the parameter $\mathcal{G}$ obtained from the parsed garment are matched by minimizing the silhouette which is a 2D polygon differences between our recovered garment $S(C,G)$ and the reference garment silhouette $S_{target}$ $$G' = \arg\min_{G} \|S(C, G) - S_{target}\|^2. \quad (10)$$

The distance between two polygons is computed by summing up the distances between each point in polygon $S(C,G)$ to the other polygon $S_{target}$. To compute the 2D silhouette $S(C, G)$, we first project the simulated garment 3D mesh $V(C, G, \hat{V}(T,\theta))$ onto the 2D image with the projection matrix H. Then compute the 2D polygon enclosing the projected points. The process is expressed as $$S(C, G) = f(H V(C, G, \hat{V}(Y,\theta))), \quad (11)$$

with f as the method that convert the projected points to a 2D polygon. We ignore the camera scaling factor in this step since the input is a single-view image. It is natural to scale the recovered clothing and human body shape as a postprocessing step.

Combining these two objectives, the objective (energy) function is expressed as $$E = \|\mathcal{K}(C,G) - \mathcal{K}(P)_{target}\|^2 + \|S(C,G) - S_{target}\|^2. \quad (12)$$

5.4 Optimization-Based Parameter Estimation

Figure 6:
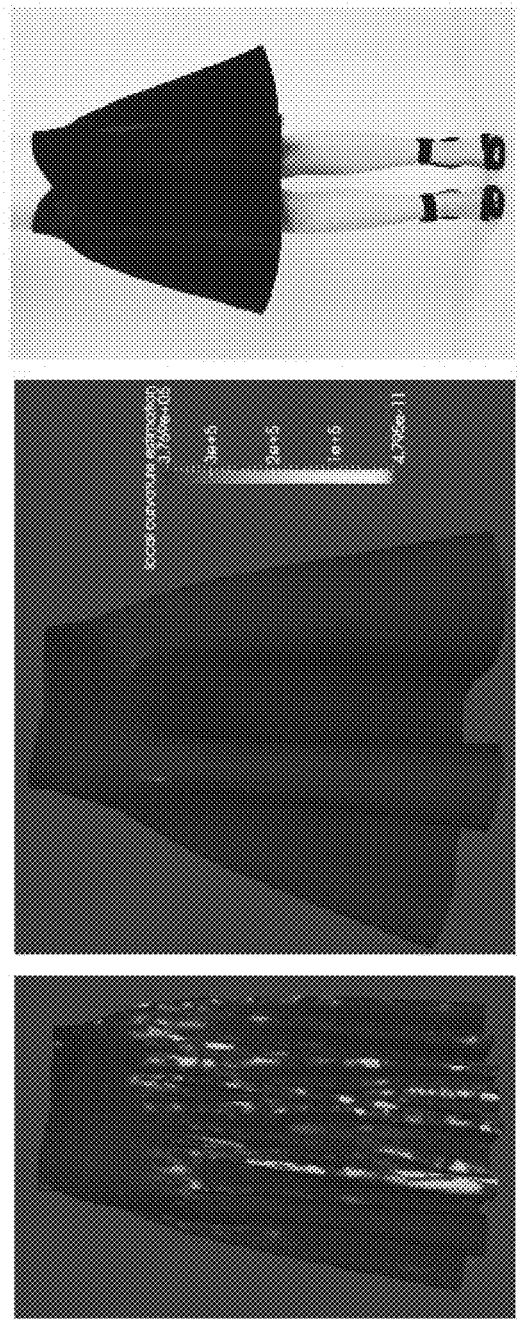
FIG. 6 shows example material parameter identification results.

FIG. 6 shows example material parameter identification results. In FIG. 6, image (a) depicts a local curvature estimation before optimizing the bending stiffness coefficients (using the cool-to-hot color map); image (b) depicts the local curvature estimation after the optimization; and image (c) depicts the original garment image [ModCloth 2015] ©.

The optimization is an iterative process (given in Algorithm 1), alternating between updates for the garment sizing and material parameters, $G$ and $C$. We found that the value of the objective function is more sensitive to the cloth material properties $C$ than to the garment parameter $G$, so we maximize the iterations when optimizing for $C$, fixing $G$. The optimization of parameter $C$ is coupled with the cloth dynamics. The underlying cloth simulator is based on the method proposed in [Narain et al. 2012]. We drape the initial fitted garment onto the human body mesh. The garment is in the dynamic state and subject to gravity. We couple our parameter estimation with this physically based simulation process. Before the simulation, we change the cloth material parameters $C$ so that when in static state the average of the local curvature κ matches the targeting threshold $\mathcal{K}_{target}$. That is to say, our optimizer minimizes $\|\mathcal{K} - \mathcal{K}_{target}\|^2$ by changing the bending stiffness parameters k and stretching stiffness parameters w.

We apply the L-BFGS [Liu and Nocedal 1989] method for our material parameter optimization. When the clothing reaches a static state, the optimizer switches to optimizing parameter $G$. The optimizer for the parameter $G$ is not coupled with the garment simulation. The objective function is evaluated when the clothing reaches the static state. We adopt the Particle Swarm Optimization (PSO) method [Kennedy 2010] for the parameter $G$ optimization. The PSO method is known to be able to recover from local minima, making it the ideal method for some of the non-convex optimization problems.

We use 40 particles for the parameter estimation process. The alternating process usually converges after four steps. One example result of the garment parameter process is shown in FIG. 6.

We constrain the cloth material parameter space. We use the "Gray Interlock" presented in [Wang et al. 2011], which is composed of 60% cotton and 40% polyester, as the "softest" material, meaning it bends the easiest. We multiply the bending parameters of this material by $10^2$ to give the "stiffest" material based on our experiments. Our solution space is constrained by these two materials, and we initialize our optimization with the "softest" material parameters.

---

Algorithm 1 Garment Parameter Identification

1: procedure SIZINGPARAMIDENTIFICATION($G, S_{target}$)
2:     Compute silhouette $S(C,G)$ using Eqn. 11
3:     Minimize $\|S(C,G) - S_{target}\|^2$ using PSO
4:     $G' = \arg\min_G \|S(C,G) - S_{target}\|^2$
5:     Update the 2D mesh U' using Eqn. 1
6:     return $G'$, U'
7: end procedure
8: procedure MATERIALPARAMIDENTIFICATION($C, \mathcal{K}_{target}$)
9:     Compute local curvature $\mathcal{K}(C)$
10:    Minimize $\|\mathcal{K}(C) - \mathcal{K}(P)_{target}\|^2$ using L-BFGS Method
11:    $C' = \arg\min_C \|\mathcal{K}(C,G) - \mathcal{K}(P)_{target}\|^2$
12:    return $C'$
13: end procedure
14: procedure MAIN($C, G, U, \epsilon$)
15:    while $E > \epsilon$ do // E as defined in Eqn. 12
16:        MATERIALPARAMIDENTIFICATION($C$)
17:        SIZINGPARAMIDENTIFICATION($G$)
18:    end while
19:    return $G', C'$, U'
20: end procedure

---

6. Joint Material-Pose Optimization

6.1 Optimal Parameter Selection

The parameter identification step provides us with the initial recovered garment described by the set of material and sizing parameters $<C, G'>$. Many realistic garment wrinkles and folds, however, are formed due to the underlying pose of the human body, especially wrinkles that are located around human joints. Therefore, in this step, we further refine our results by optimizing both the pose parameters of the human body θ and the material properties of the cloth $C'$. The optimization objective for this step is $$E_{joint} = \|G(C', \theta) - G(P)_{target}\|^2. \quad (13)$$

The optimization process (shown in Algorithm 2) is similar to the garment parameter identification step, alternating between updating the pose parameter θ and the material parameters $C'$. We use Particle Swarm Optimization method [Kennedy 2010].

The objective function (Equation 13) is more sensitive to the pose parameter θ than to the material parameters $C'$. We constrain the optimization space of parameter θ by confining the rotation axis to only the three primal axes. An example of our joint material-pose optimization method is shown in FIG. 7.

Figure 7:
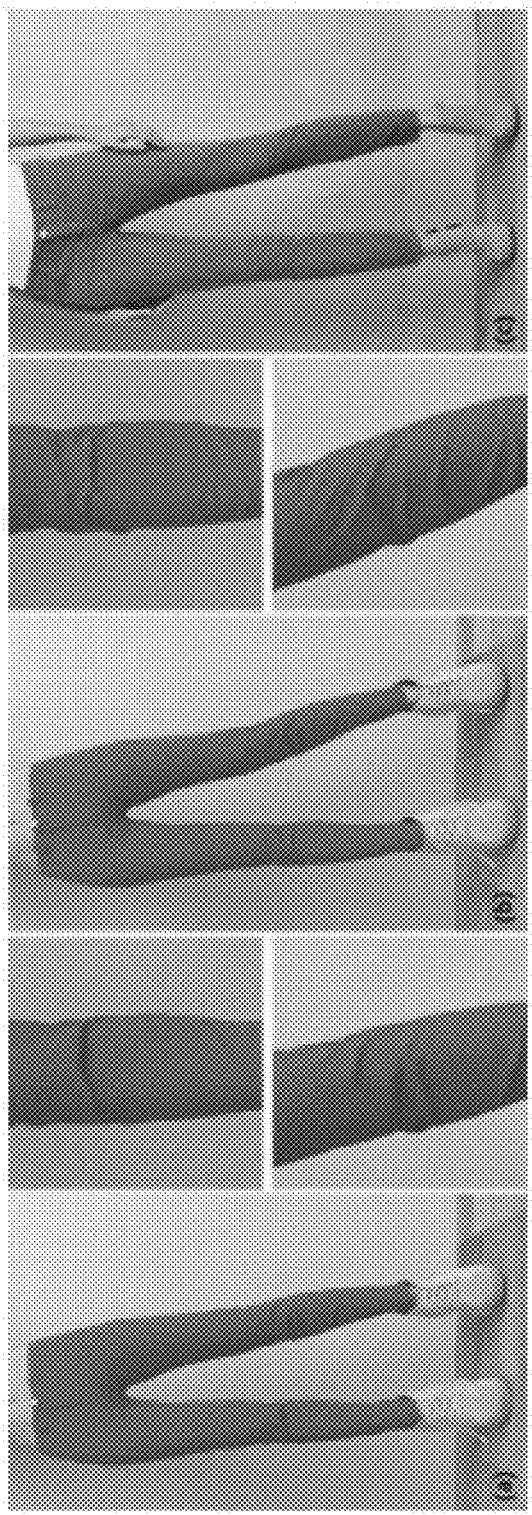
FIG. 7 shows example joint material-pose optimization results.

FIG. 7 shows example joint material-pose optimization results from an example material-pose optimization method described herein. In FIG. 7, image (a) depicts pants recovered prior to the joint optimization; image (b) depicts the recovered pants after optimizing both the pose and the material properties; and image (c) depicts the original image of the pants [Anthropologie 2015] ©. As shown in FIG. 7, the wrinkles in the knee area in image (b) better match with those in image (c), i.e., the original image.

Algorithm 2 Joint Pose-Material Parameter Identification

```
1:   procedure MAIN(C', G', θ, ε)
2:     while E_joint > ε do        // E_joint as defined in Eqn. 13
3:       Fix C', Optimize for θ using Particle Swarm Method
```

$$\theta' = \underset{\theta}{\mathrm{argmin}} \|\mathcal{K}(C', \theta) - \mathcal{K}(\mathcal{P})_{target}\|^2. \quad (14)$$

```
4:       Fix θ, Optimize for C' using Particle Swam Method
```

$$\tilde{C} = \underset{C'}{\mathrm{argmin}} \|\mathcal{K}(C', \theta) - \mathcal{K}(\mathcal{P})_{target}\|^2. \quad (15)$$

```
5:     end while
6:     return C̃, θ'
7:   end procedure
```

6.2 Application to Image-Based Virtual Try-on

This joint material-pose optimization method can be applied directly to image-based virtual try-on. We first recover the pose and shape of the human body <θ,z> from the single-view image. Then we dress the recovered human body with the reconstructed garments <$\tilde{C}$, $\tilde{G}$, $\tilde{U}$, $\tilde{V}$> from other images. We perform the initial garment registration step (Sec. 4.3) to fit the 3D surface mesh $\hat{V}$ onto the recovered human body <θ,z>.

Existing state-of-the-art virtual try-on rooms require a depth camera for tracking, and overlay the human body with the fitting garment [Ye et al. 2014]. Our algorithm, on the other hand, is able to fit the human body from a single 2D image with an optimized virtual outfit recovered from other images. We provide the optimized design pattern together with a 3D view of the garment fitted to the human body.

The fitting step may require iterative optimization in both the garment parameters and the human-body poses. As in a real fitting process, we vary the sizing of the outfits for human bodies of different sizes and shapes. When editing in parameter space using the methods introduced in the previous section, we ensure that the recovered garment can fit on the human body while minimizing the distortion of the original design. For each basic garment, we may use one template pattern and the corresponding set of parameters. To preserve the garment design, we do not change the material properties of the fabric when virtually fitting the recovered garment to a new mannequin.

7. Results and Discussion

We have implemented an example algorithm described herein in C++ and demonstrated the effectiveness of this approach herein. In this section, we show example results, performance, and comparisons to other garment recovery methods.

7.1 Garment Recovery Results

Figure 8:
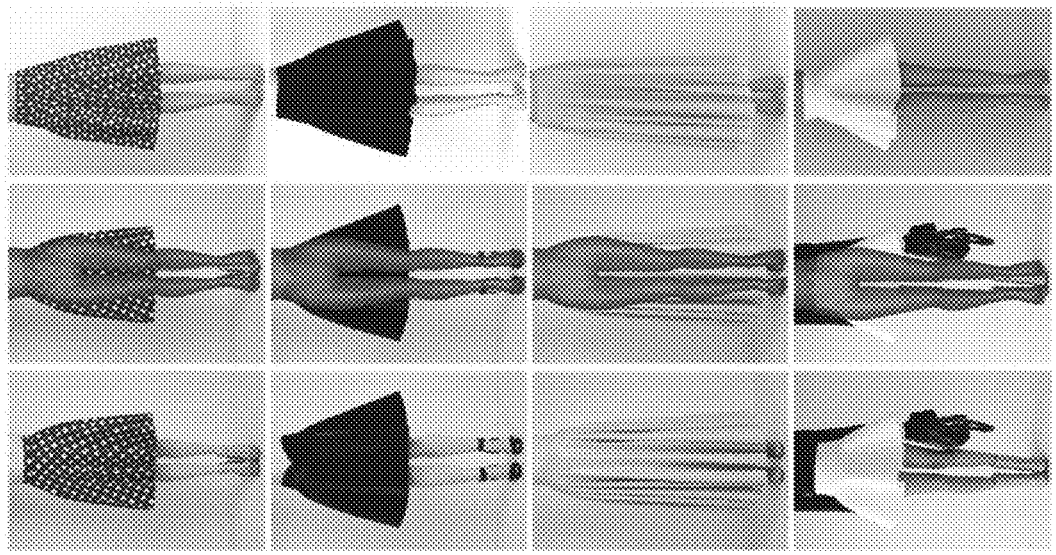
FIG. 8 shows example skirt recovery results.
Figure 9:
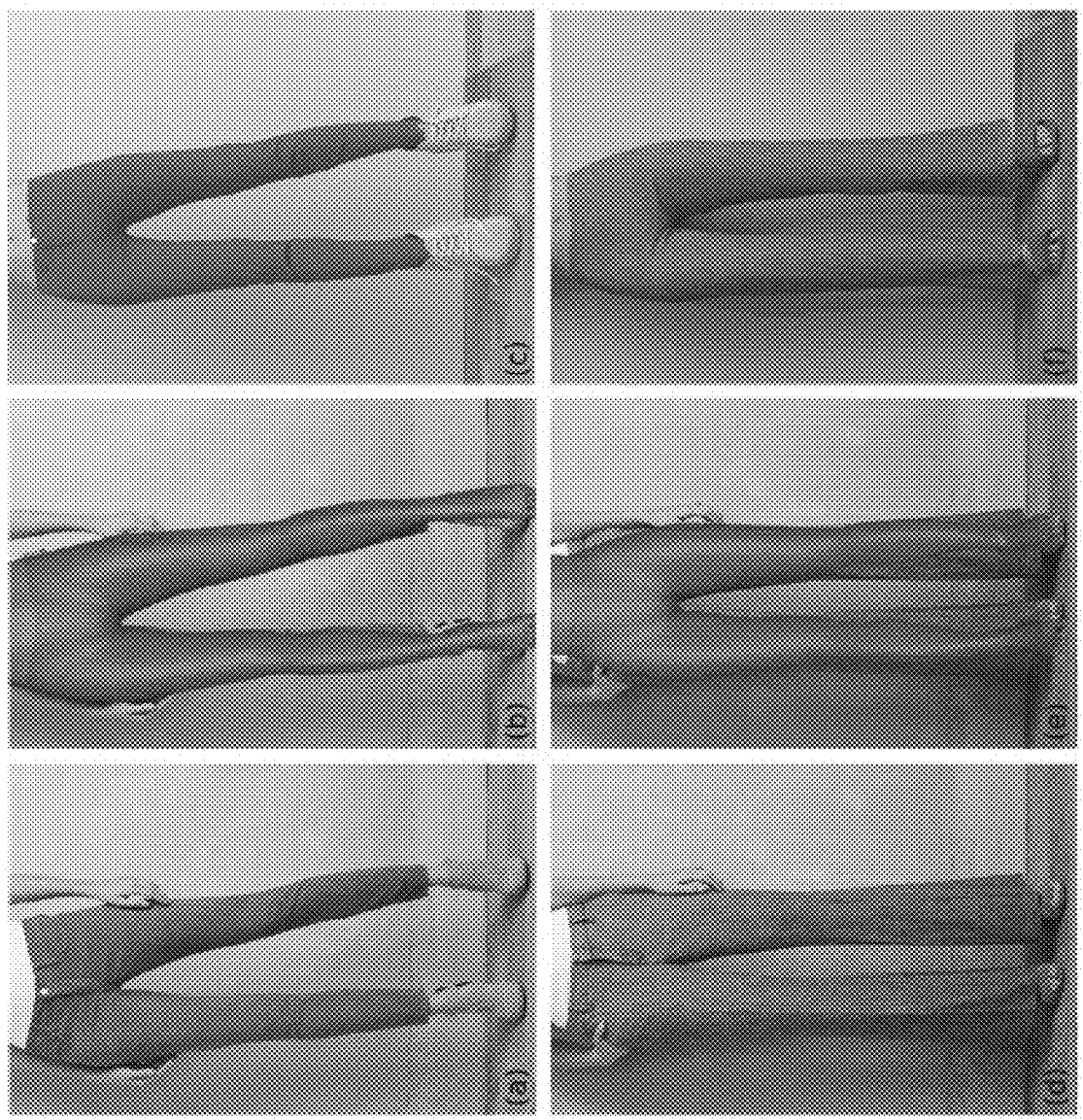
FIG. 9 shows example pants recovery results.

In FIG. 8 and FIG. 9, results of an example garment recovery method described herein are shown for recovered garments of different styles and materials.

FIG. 8 shows example skirt recovery results. In FIG. 8, the left images depict original images of partially occluded, folded skirts [ModCloth 2015] ©; the center images depict recovered human meshes overlaid on the original images; and the right images depict recovered skirts using an example garment recovery method described herein.

FIG. 9 shows example pants recovery results. In FIG. 9, the left images depict original images of pants [Anthropologie 2015] ©; the center images depict recovered human meshes overlaid on the original images; and the right images depict recovered pants using an example garment recovery method described herein.

Figure 10:
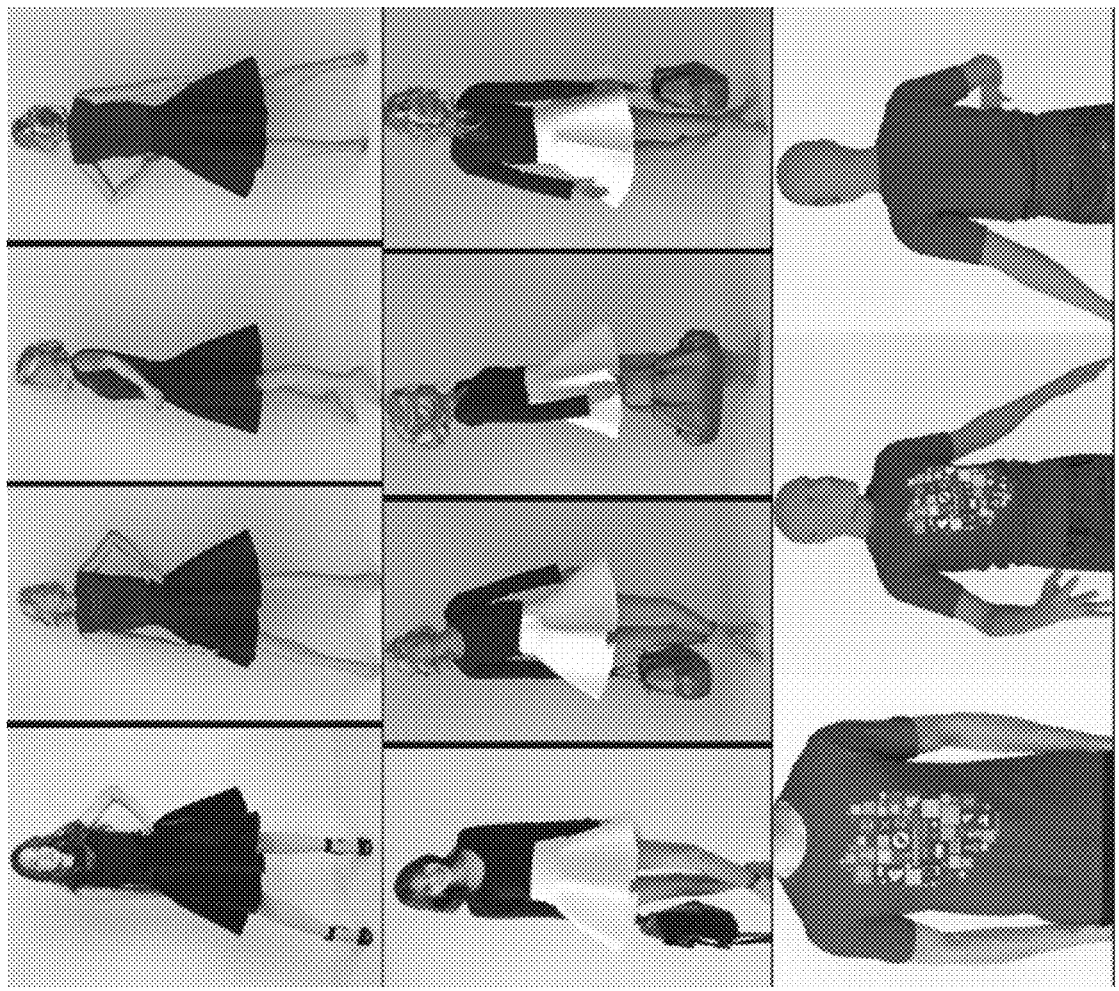
FIG. 10 shows example garment recovery results.

FIG. 10 shows example garment recovery results. In FIG. 10, the top two rows show an input image (leftmost image) [ModCloth 2015; AliExpress 2015; RedBubble 2015] © and recovered garment on an extracted human body in various poses and the bottom row shows an input image (leftmost image) and the recovered garment on a twisted body. FIG. 10 demonstrates the effectiveness of an example method described herein for the recovery of partially occluded garments. It also shows that a recovered garment can be applied to human bodies in different poses.

Figure 11:
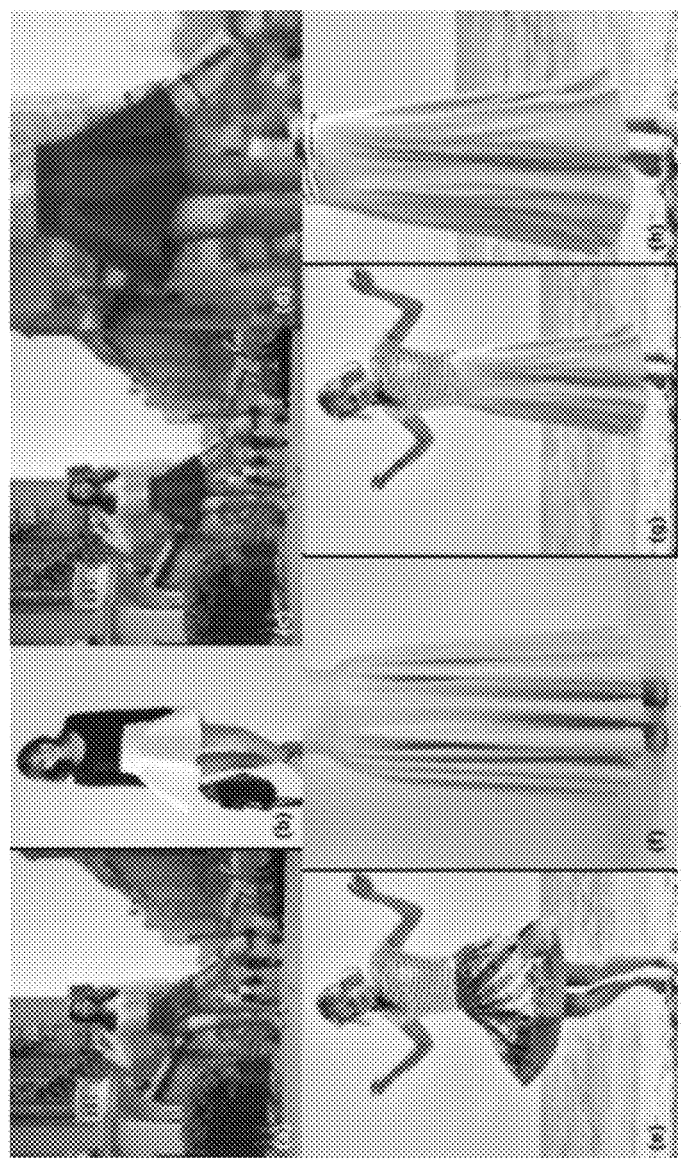
FIG. 11 shows example image-based garment transfer results associated with a garment recovered using an example garment recovery method described herein.

FIG. 11 shows example image-based garment transfer results associated with a garment recovered using an example garment recovery method described herein. In FIG. 11, a woman in image (a) [FashionableShoes 2013; Boden 2015] © is dressed with a skirt recovered from image (b) [AliExpress 2015; ModCloth 2015] © and image (c) depicts the recovered skirt modified by some wind motion to animate the retargeted skirt, as shown in image (d). FIG. 11 also shows another example of garment transfer is given in images (e)-(h).

Image-Based Garment Virtual Try-On: We show examples of an image-based garment virtual try-on method described herein (Sec. 6.2) in FIG. 1 and FIG. 11. We can effectively render new outfits onto people from only a single input image.

Figure 12:
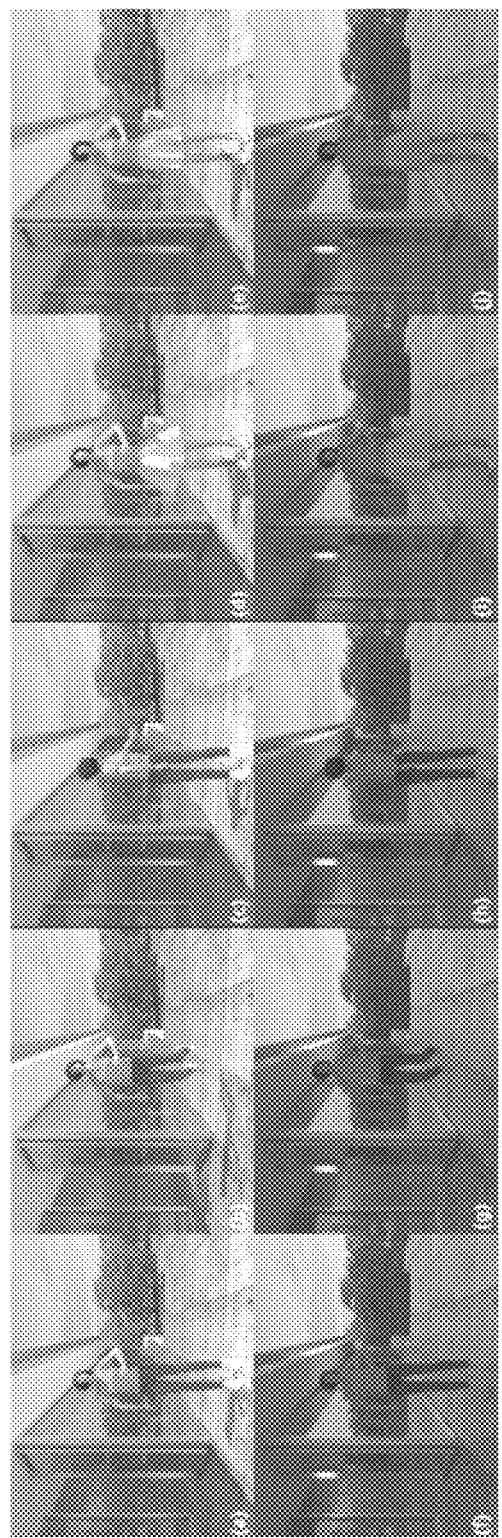
FIG. 12 shows synthetic evaluation scenes with different factors.

Evaluation: FIG. 12 shows synthetic evaluation scenes with different factors. In FIG. 12, images (a)-(c) show a fixed body shape with different poses; images (d)-(e) shows a fixed body shape with skirts of different material; and images (f)-(j) show same scene setup as (a)-(e) but with different lighting condition.

We evaluate the accuracy of the recovered sizing parameters $\mathcal{G}$ and local curvature $\mathcal{K}$ using synthetic scenes. Each synthetic scene has two lighting conditions, mid-day, and sunset (shown in FIG. 12). We fix the both the extrinsic and the intrinsic camera parameters for scene rendering, and the garments are in static equilibrium. Through these ten test cases, we can best validate the accuracy and reliability of our method against different body poses and lighting conditions on t-shirts and pants, as the sizing and material parameters are known exactly and do not require noisy measurements and/or data fitting to derive a set of estimated/measured parameters (which are not likely to be 100% accurate) to serve as the ground truth. The evaluation result, after eliminating the camera scaling factor, is shown in Table II.

We found that the lighting conditions mainly affect the body silhouette approximation and the garment folding parsing, while the body skeleton approximation is affected by the pose. Overall, we achieve an accuracy of up to 90.2% for recovering the sizing parameters and 82% for recovering the material parameters for t-shirts and pants under different body poses and lighting conditions. The accuracy is computed as the average accuracy for each parameter from the ground truth.

We evaluate the accuracy of the recovered material properties by measuring the difference between the ground truth and that of the recovered garment for both the mean curvature and the material parameters, as the accuracy of mean-curvature recovery also correlates with the accuracy of the material-parameter estimation. As shown in Table III, we are able to achieve an accuracy of up to 86.7% and 80.2%, respectively, for the recovery of mean curvatures and different material parameters for the skirt.

7.2 Comparison with Other Related Work

We compare results from an example method described herein with the multi-view reconstruction method CMP-MVS [Jancosek and Pajdla 2011] together with the structure-from-motion framework [Wu 2011; 2013]. For a fair comparison, we apply smoothing [Taubin 1995] to the results of their work.

Figure 13:
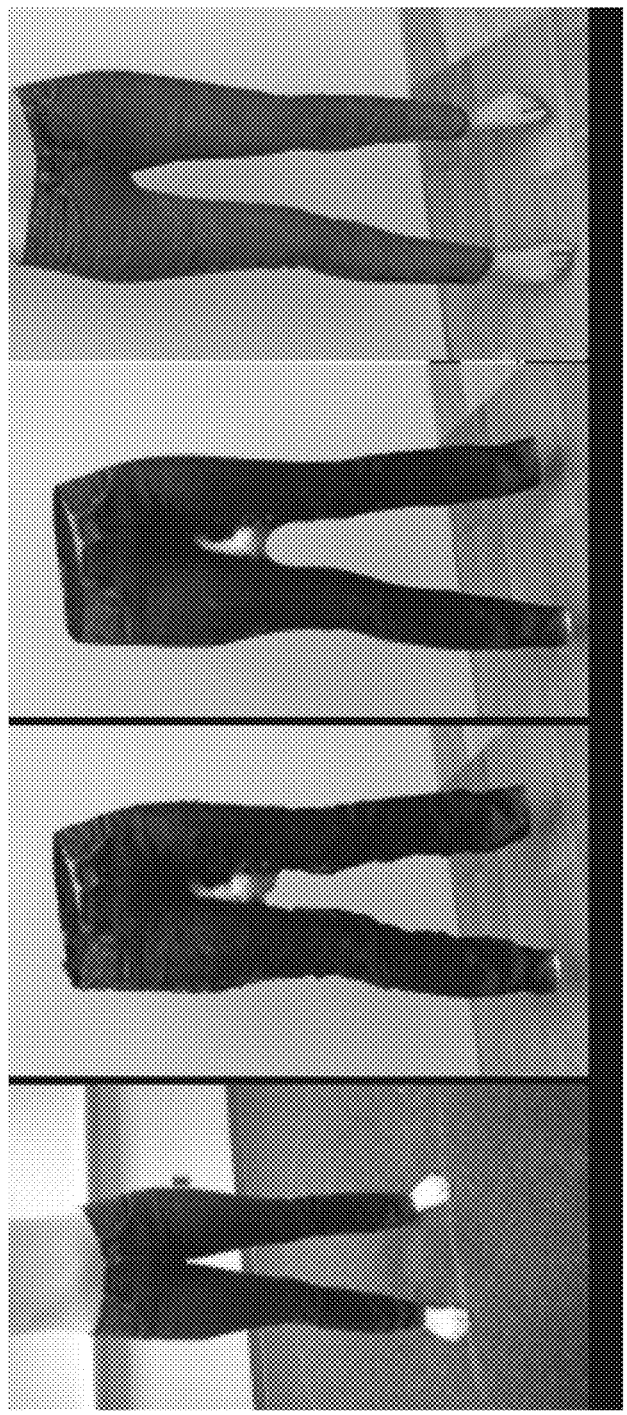
FIG. 13 shows images of pants for comparing an example garment recovery method described herein to another method.

FIG. 13 shows images of pants for comparing an example garment recovery method described herein to another method. In FIG. 13, image (a) is a video frame of a multi-view video; image (b) shows the results of the CMP-MVS method before smoothing; image (b) shows the results of the CMP-MVS method after smoothing; and image (d) shows the results of an example garment recovery method described herein using only one frame of the video.

Figure 14:
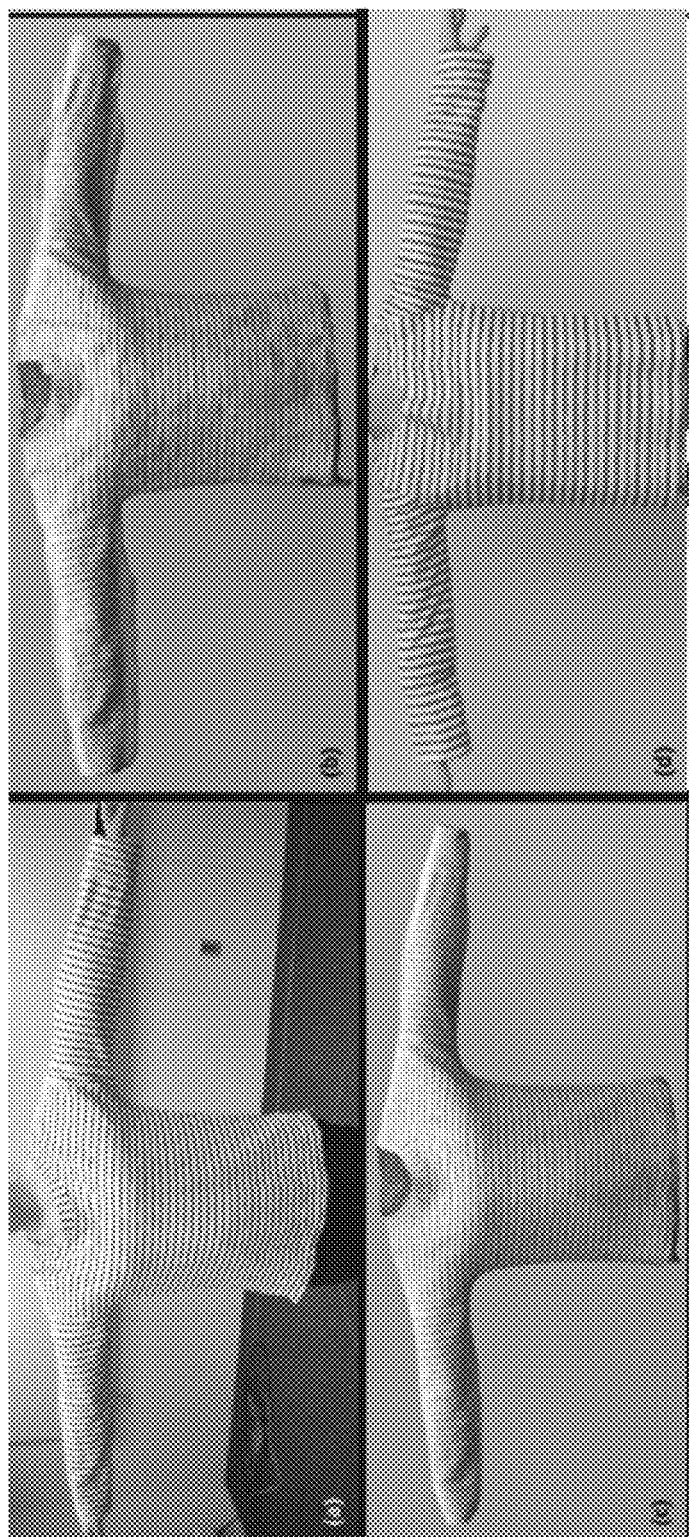
FIG. 14 shows images of shirts for comparing an example garment recovery method described herein to another method.

FIG. 14 shows images of shirts for comparing an example garment recovery method described herein to another method. In FIG. 13, image (a) is a video frame of a multi-view video; image (b) shows the results of the CMP-MVS method before smoothing; image (b) shows the results of the CMP-MVS method after smoothing; and image (d) shows the results of an example garment recovery method described herein using only one frame of the video.

FIG. 13 and FIG. 14 show that the garment recovered using our method is clean and comparable in visual quality to the recovered garments using multi-view methods. In addition, we are able to estimate the material properties from one single-view image for virtual try-on applications.

We further compare the results of an example method in accordance with aspects described herein against two recent methods—one using 3D depth information and an expert-designed 3D database [Chen et al. 2015], and the other using a large database of manually labeled garment images [Jeong et al. 2015]. Our method, which does not require depth information, an expert-designed 3D database, or a large manually labeled garment image database, achieves a comparable level of high accuracy to Chen et al. [2015] (see FIG. 15) and higher visual quality when compared with Jeong et al. [2015] (see FIG. 16). In addition, our method is able to recover material and estimate sizing parameters directly from a given image.

Figure 15:
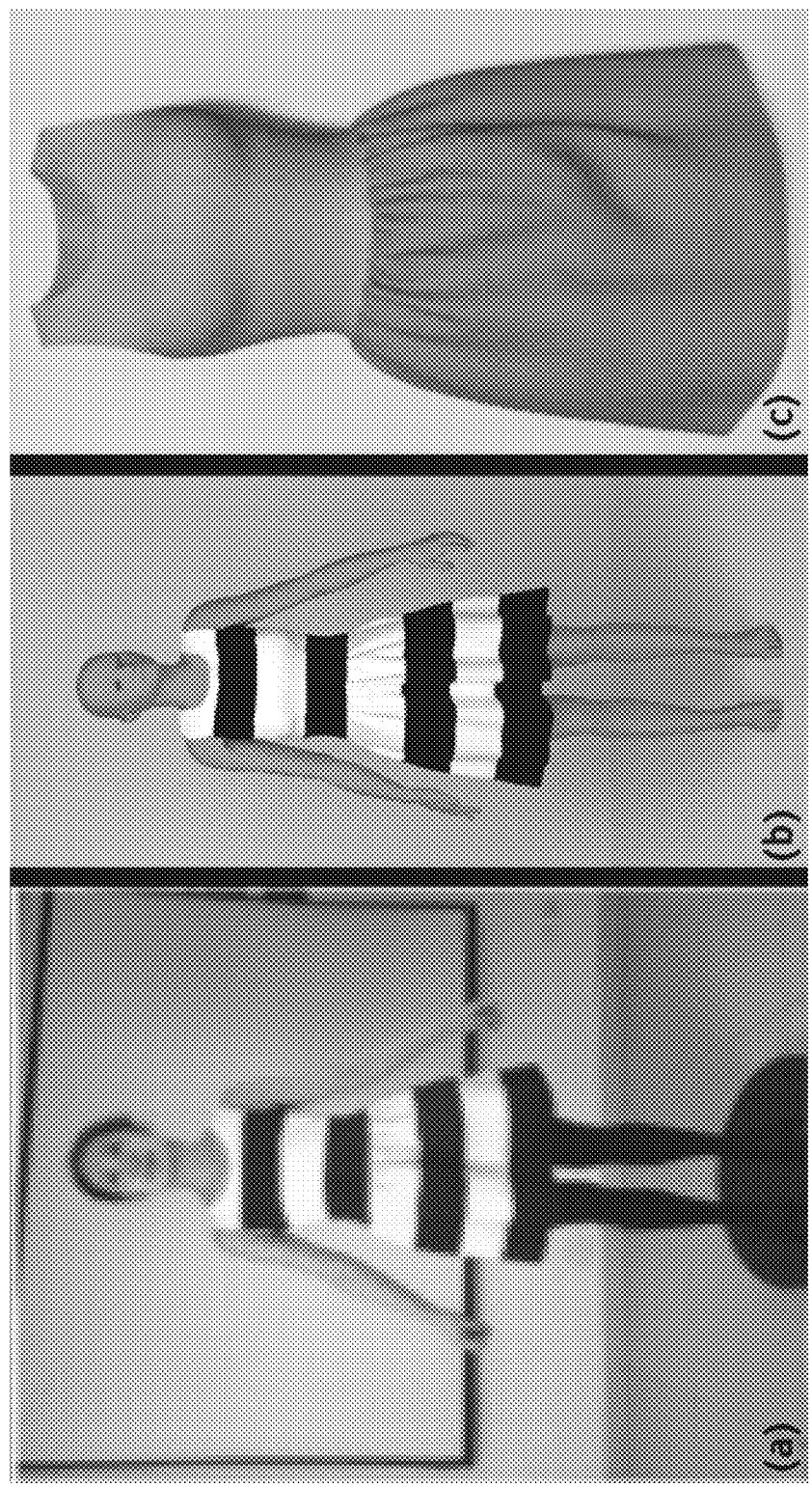
FIG. 15 shows images of dresses for comparing an example garment recovery method described herein to another method.

FIG. 15 shows images of dresses for comparing an example garment recovery method described herein to another method. In FIG. 15, image (a) depicts an input image of a woman in a dress (© 2015 ACM) from Chen et al. [2015]; image (b) depicts recovered garment results from only single-view RGB image (e.g., the input image); and image (c) depicts recovery results (© 2015 ACM) from Chen et al. [2015] using both RGB image and depth information.

Figure 16:
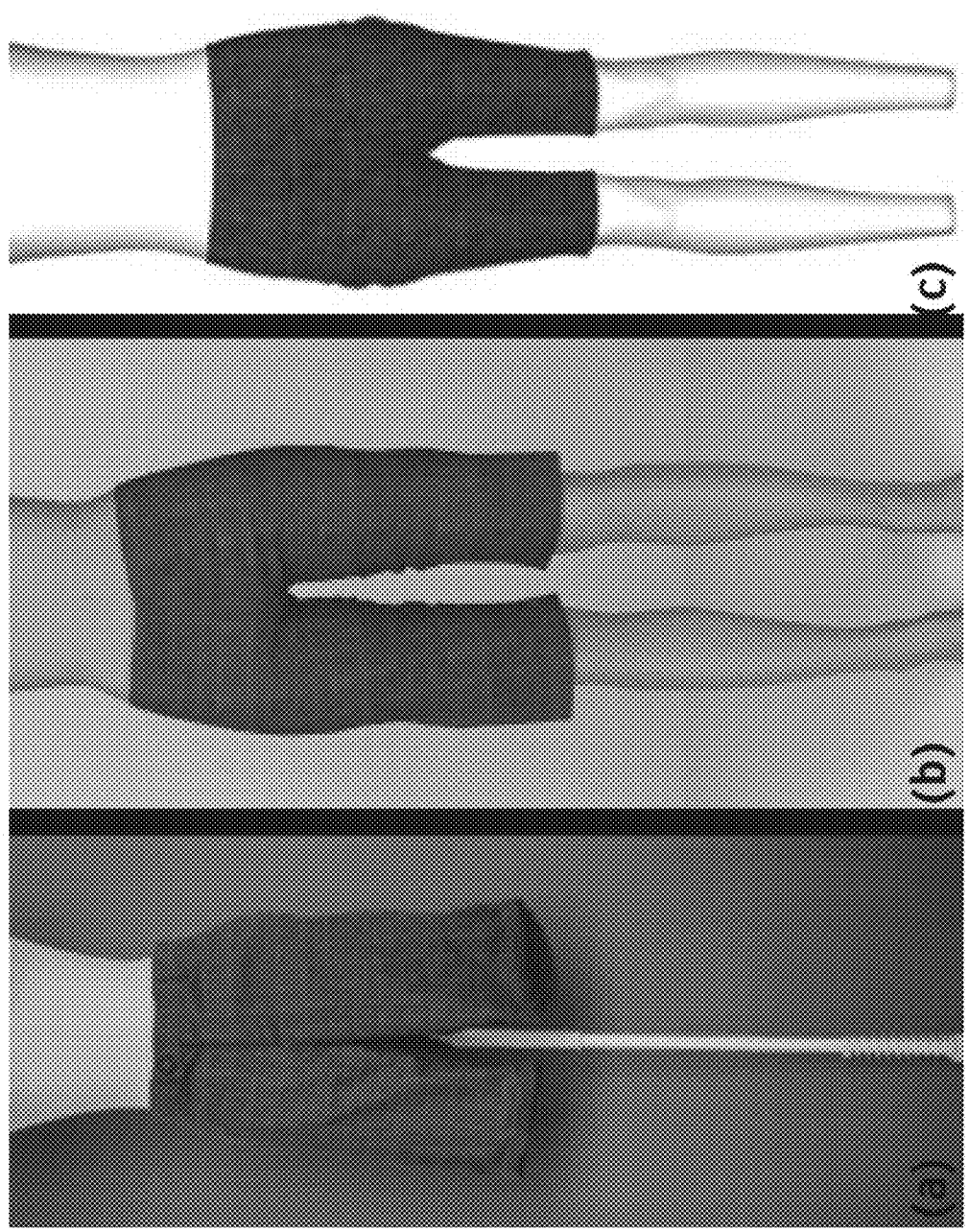
FIG. 16 shows images of shorts for comparing an example garment recovery method described herein to another method.

FIG. 16 shows images of shorts for comparing an example garment recovery method described herein to another method. In FIG. 15, image (a) depicts an input image of a woman in a dress (© 2015 Wiley) from Jeong et al. [2015]; image (b) depicts recovered garment results from only a single-view RGB image (e.g., the input image); and image (c) depicts recovery results (© 2015 Wiley) from Jeong et al. [2015].

TABLE II

The accuracy of the recovered sizing and material parameters. The accuracy of the recovered sizing and material parameters of the t-shirt and the pants (in percentages).
T-Shirt Pants Scene

| | Pose | | | | | |
| --- | --- | --- | --- | --- | --- | --- |
| Lighting | a Mid-Day | a Sunset | b Mid-Day | b Sunset | c Mid-Day | c Sunset |
| $G_{tshirt}$ Accuracy | 90.2 | 88.3 | 89.8 | 88.1 | 88.3 | 86.3 |
| $G_{pants}$ Accuracy | 89.3 | 87.6 | 85.8 | 83.3 | 88.2 | 87.5 |
| $C_{tshirt}$ Accuracy | 80.6 | 81.3 | 79.2 | 81.5 | 80.9 | 82.0 |
| $C_{pants}$ Accuracy | 80.3 | 78.6 | 80.0 | 80.7 | 80.3 | 80.5 |

TABLE III

The accuracy of recovered garment curvature and material parameters. The accuracy of the recovered garment local mean curvature and material parameters of the skirt (in percentages).
T-Shirt Skirt Scene

| Material Lighting | Low Bending Mid-Day | Low Bending Sunset | High Bending Mid-Day | High Bending Sunset |
| --- | --- | --- | --- | --- |
| $K_{skirt}$ Accuracy | 86.7 | 83.4 | 85.3 | 82.5 |
| $G_{skirt}$ Accuracy | 80.2 | 78.9 | 81.3 | 78.3 |

7.3 Performance

We executed an example garment recovery method and/or related algorithms described herein on a desktop with an Intel Core i7 central processing unit (CPU), 3.20 GHz. In some embodiments, for each garment, the pipeline of an example garment recovery method may take on average 4 to 6 hours. The garment parameter identification (Sec. 5) and joint material-pose optimization (Sec. 6.1) may take around 60%-80% of the entire process. The preprocessing step (Sec. 4.2) may take around 20%-30%. The performance may depend on the complexity of the garment, the image quality, and how much the garment is occluded.

7.4 Discussions

Estimation of Material Parameters: Our material recovery method depends on the existence of wrinkles and folds of the garment. In cases where no or very few wrinkles or folds are present, other image features, such as textures and shading, may be required to identify the material properties. In most garments like shirts, skirts, or dresses, wrinkles and folds are common (especially around the joints or from the garment stylization), and can be highly informative with regards to garment material properties. Based on this observation, we are able to estimate material parameters as well as recover garment geometry from single-view images. This capability is useful and advantageous, and it is also one of various features differentiating aspects of the subject matter described herein from existing techniques.

Accuracy of Geometry Reconstruction: In general, it is expected that recovery from single-view images should yield less accurate results than from standard 3D reconstruction and/or the most recent 3D multi-view methods. Our method adopts accurate physics-based cloth simulation to assist in the recovery process and achieves comparable visual quality, with a focus on capturing plausible wrinkles and folds, as well as material parameters usable for virtual try-on using only photographs.

However, it is important to note that high visual quality does not always guarantee geometric accuracy in 3D garment recovery. At the same time, for some applications such as virtual try-on, rapid design, and prototyping, it is unclear if a high degree of geometric accuracy is required; it is also unknown how much error tolerance is needed for the comfortable fitting of garments. These are important considerations for further investigation in application to fashion design and e-commerce.

8. Further Thoughts and Future Work

In the subject matter described herein, various algorithms, techniques, systems, and methods are disclosed herein for highly detailed garment recovery from a single-view image. One example approach recovers a 3D mesh of a garment together with a 2D design pattern, fine wrinkles and folds, and material parameters. The recovered garment can be re-targeted to other human bodies of different shapes, sizes, and poses for virtual try-on and character animation.

In some embodiments, one example approach may depend on two databases: a database of commonly available garment templates and a database of human-body models.

In some embodiments, the range of garments recoverable, to some extent, may be dependent on the available garment templates. For example, an example parameter identification method may only generate garments that are "morphable" from the garment template, i.e. homeomorphic to the garment template. In another example, if only one template is used for each garment type, variations in some clothing details, e.g. multi-layered skirts, or collars on shirts, may not be adequately modeled. In some embodiments, where just a few garment templates are available and an input garment is not morphable from the templates, an example method may recover whichever version of the garment is closest to the actual garment. With a more extensive set of templates, an example method may model more variations of styles and cuts, with richer garment details.

In some embodiments, an example method described herein may utilize various sets of semantic parameters to represent human body shapes. For example, a set of semantic parameters z may be used that is sufficient to represent most common human body shapes.

In some embodiments, known artifacts of linear human shape blending can affect human body shape recovery results. For example, an example method described herein may utilize state-of-art 3D human pose recovery methods. In this example, manual intervention may be needed if automatic methods fail to output a reasonably accurate 3D human pose.

In some embodiments, a parallelized implementation of a system or method described herein may be executed on a graphics processing unit (GPU) or a many-core CPU for fast garment recovery. In such embodiments, an underlying cloth simulator and a wrinkle optimization process may be significantly accelerated.

In some embodiments, a system or method described herein may be configured to enable fabric material transfer from videos for interactive virtual try-on.

In some embodiments, a system or method described herein may be configured to compute and utilize various perception metrics, similar in spirit to [Sigal et al. 2015]. For example, if a garment recovery system can identify perception metrics associated with an input video or image(s), the system may be able to more accurately recover a garment from the input data.

Reference will now be made in detail to various embodiments of the subject matter described herein, examples of which are illustrated in the accompanying drawings. Wherever possible, the same reference numbers will be used throughout the drawings to refer to the same or like parts.

Figure 17:
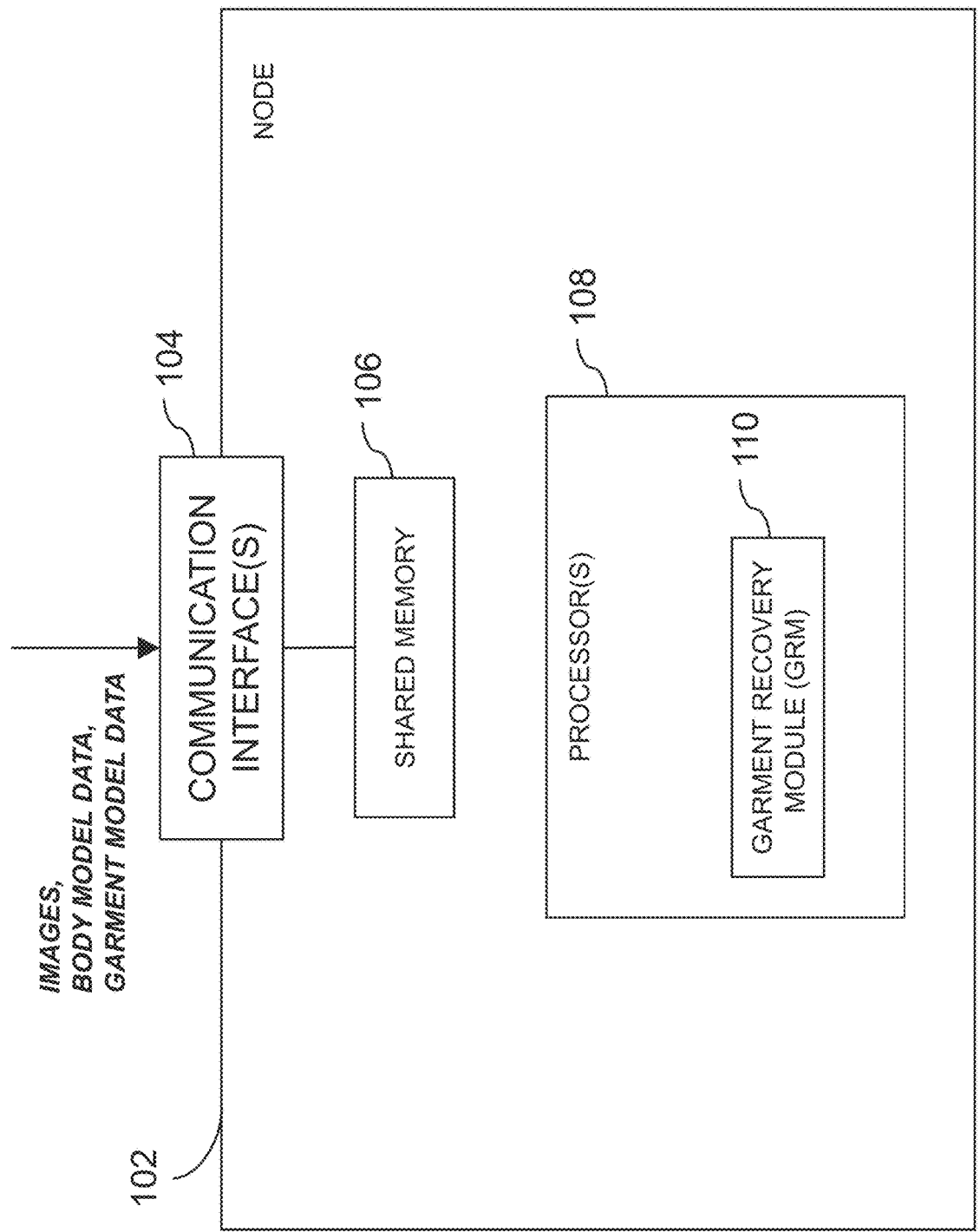
FIG. 17 is a diagram illustrating an example node for modeling garments using single view images.

FIG. 17 is a diagram illustrating an example node 102 for modeling garments using single view images. Node 102 may be any suitable entities, such as one or more single or multi-processor computing devices or platforms, for performing one more aspects of the present subject matter described herein or in the attached manuscript entitled "Detailed Garment Recovery from a Single-View Image;" the disclosure of the attached manuscript is incorporated herein by reference in its entirety. In some embodiments, components, modules, and/or portions of node 102 may be implemented or distributed across multiple devices or computing platforms.

Node 102 may include one or more communications interface(s) 104, a memory 106, and one or more processor(s) 108. Communications interface 104 may be one or more suitable entities (e.g., a network interface card (NIC)) for receiving, sending, and/or copying messages or data. In some embodiments, communications interface(s) 104 may receive images and/or base models (e.g., templates or related data) from various data stores. For example, communications interface(s) 104 may receive an image (e.g., a single view or two-dimensional image) of a person wearing at least one garment (e.g., clothing) and may also request and receive data from one or more databases to obtain body model information and/or garment model information.

In some embodiments, communications interface(s) 104 may also include or utilize a user interface, machine to machine (MIM), an application programming interface (API), and/or a graphical user interface (GUI). For example, some user input, such as a sketch by the user indicating a body outline of a person in an image and an indication of multiple body joint location of the person in the image may be provided via a user interface and used when performing garment recovery or modeling. In another example, a node or system may send input or various data via an API or other MIM interface Memory 106 may be any suitable entity (e.g., random access memory or flash memory) for storing algorithms, data, system preferences, and/or other information related to garment recovery, such as modeling parameters, garment material properties, or garment sizing information. Various components, such as communications interface(s) 104 and software executing on processor(s) 108, may access memory 106.

Processor(s) 108 represents one or more suitable entities (e.g., a physical processor, a field-programmable gateway array (FPGA), and/or an application-specific integrated circuit (ASIC)) for performing one or more functions associated with garment recovery (e.g., virtual garment modeling). Processor(s) 108 may be associated with a garment recovery module (GRM) 110. GRM 110 may be configured to use various techniques, models, algorithms, and/or data in performing garment recovery, e.g., generating virtual garment models from images (e.g., single view or two dimensional photographs).

In some embodiments, GRM 110 may be configured to generate an accurate body model may obtaining an input image, 14 joint positions on the image and a rough outline or sketch outlining the human body in the image. In some embodiments, this information may be provided by a user or automated using image processing and body templates for various poses. From this information, GRM 110 may use a statistical human model to automatically generate a human body mesh for the image. To estimate the clothing model, GRM 110 may compute a semantic parse of the garments in the image to identify and localize depicted clothing items. This semantic segmentation may be computed automatically using a data-driven method for clothing recognition or by user indication. GRM 110 may also use the semantic parsing to extract garment sizing information, such as waist girth, skirt length and so on, which can then be used to map the depicted garments onto the existing garment templates and adjust the sizing parameters of sewing patterns based on the extracted parameters. GRM 110 may also analyze the segmented garments to identify the location and density of wrinkles and folds in the recovered garments, which may be useful for estimating material properties of the garments for virtual try-on. Once the body model and clothing (e.g., garment) models, GRM 110 may perform an image-guided parameter identification process, which optimizes the garment template parameters based on the reconstructed human body and image information. GRM 110 may then fit a three-dimensional (3D) garment template's surface mesh onto the human body model to obtain the initial 3D garment, then jointly optimize or adjust the material parameters, the body shape, and the pose to obtain a final result.

In some embodiments, GRM 110 may be configured to work in parallel with a plurality of processor(s) 108. For example, a plurality of processor(s) 108 may each be associated with a GRM 110 and/or data structure. In this example, each GRM 110 may perform modeling functions and/or data processing independently or may work in concert with other GRMs 110 where each GRM 110 performs a portion of a garment recovery.

It will be appreciated that FIG. 17 is for illustrative purposes and that various nodes, their locations, and/or their functions may be changed, altered, added, or removed. For example, some nodes and/or functions may be combined into a single entity. In a second example, a node and/or function may be located at or implemented by two or more nodes.

FIG. 18 is a flow diagram of an example method 1800 for modeling garments using single view images. In some embodiments, method 1800 performed by a system of one or more computers, e.g., node 102 of FIG. 17 executing GRM 110.

Referring to method 1800, in step 1802, an image depicting a person wearing at least one garment may be received.

In step 1804, a body model may be constructed based on the person in the image and a template from a body model database.

In step 1806, at least one garment model may be constructed based on the at least one garment in the image and at least one template from a garment model database.

In step 1808, a combined model may be constructed based on the body model and the at least one garment model.

In step 1810, the combined model may be adjusted by modifying body pose parameters and garment material properties.

In some embodiments, prior to constructing a body model, a body outline associated with a person in an input image may be received and multiple human body joint locations associated with the person in the image may be identified.

In some embodiments, a body outline or multiple human body joint locations may be provided by a user.

In some embodiments, a body outline or multiple human body joint locations may be determined automatically using image processing and/or related algorithms.

In some embodiments, constructing a body model may include determining a human body shape and a body pose for an input image.

In some embodiments, constructing at least one garment model may include estimating locations and types of garments in an input image.

In some embodiments, at least one garment model may include computing at least one average wrinkle density for at least one garment and using the at least one average wrinkle density and a physics-based cloth simulator to derive garment material properties of the at least one garment.

In some embodiments, a combined model may include aligning at least one garment model and a body model based on joint related information for the body model and the at least one garment model.

In some embodiments, adjusting a combined model may include using at least one iterative process and a physics-based cloth simulation for adjusting garment sizing information, garment material properties, and body pose parameters.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

REFERENCES

The disclosures of all of the references listed herein are hereby incorporated herein by reference in their entireties.

AGARWAL, A. AND TRIGGS, B. 2006. Recovering 3d human pose from monocular images. *Pattern Analysis and Machine Intelligence, IEEE Transactions on* 28, 1, 44-58.

ALIEXPRESS. 2015. http://www.aliexpress.com.

ANGUELOV, D., SRINIVASAN, P., KOLLER, D., THRUN, S., RODGERS, J., AND DAVIS, J. 2005. Scape: shape completion and animation of people. In *ACM Transactions on Graphics (TOG)*. Vol. 24. ACM, 408-416.

ANTHROPOLOGIE. 2015. http://www.anthropologie.com.

BALAN, A. O., SIGAL, L., BLACK, M. J., DAVIS, J. E., AND HAUSSECKER, H. W. 2007. Detailed human shape and pose from images. In 2007 *IEEE Conference on Computer Vision and Pattern Recognition*. IEEE, 1-8.

BARAFF, D. AND WITKIN, A. 1998. Large steps in cloth simulation. In *Proceedings of the 25th annual conference on Computer graphics and interactive techniques*. ACM, 43-54.

BARNFIELD, J. 2012. *The pattern making primer: all you need to know about designing, adapting and customizing sewing patterns*. Barron's Educational Series, Inc, Hauppauge, N.Y.

BÉRARD, P., BRADLEY, D., NITTI, M., BEELER, T., AND GROSS, M. 2014. High-quality capture of eyes. *ACM Transactions on Graphics (TOG)* 33, 6, 223.

BERTHOUZOZ, F., GARG, A., KAUFMAN, D. M., GRINSPUN, E., AND AGRAWALA, M. 2013. Parsing sewing patterns into 3d garments. *ACM Transactions on Graphics (TOG)* 32, 4, 85.

BODEN. 2015. http://www.bodenusa.com.

BRIDSON, R., FEDKIW, R., AND ANDERSON, J. 2002. Robust treatment of collisions, contact and friction for cloth animation. In *ACM Transactions on Graphics (ToG)*. Vol. 21. ACM, 594-603.

BRIDSON, R., MARINO, S., AND FEDKIW, R. 2003. Simulation of clothing with folds and wrinkles. In *Proceedings of the 2003 ACM SIGGRAPH/Eurographics symposium on Computer animation*. Eurographics Association, 28-36.

BRONSTEIN, A. M., BRONSTEIN, M. M., AND KIMMEL, R. 2006. Efficient computation of isometry-invariant distances between surfaces. *SIAM Journal on Scientific Computing* 28, 5, 1812-1836.

BRONSTEIN, A. M., BRONSTEIN, M. M., AND KIMMEL, R. 2008. *Numerical geometry of non-rigid shapes*. Springer Science & Business Media.

BROUET, R., SHEFFER, A., BOISSIEUX, L., AND CANI, M.-P. 2012. Design preserving garment transfer. *ACM Trans. Graph.* 31, 4, 36.

CAO, C., WENG, Y., LIN, S., AND ZHOU, K. 2013. 3d shape regression for real-time facial animation. *ACM Transactions on Graphics (TOG)* 32, 4, 41.

CASATI, R., DAVIET, G., AND BERTAILS-DESCOUBES, F. 2016. Inverse elastic cloth design with contact and friction. Ph.D. thesis, Inria Grenoble Rhône-Alpes, Université de Grenoble.

CHAI, M., WANG, L., WENG, Y., YU, Y., GUO, B., AND ZHOU, K. 2012. Single-view hair modeling for portrait manipulation. *ACM Trans. Graph.* 31, 4 (July), 116:1-116:8.

CHEN, X., GUO, Y., ZHOU, B., AND ZHAO, Q. 2013. Deformable model for estimating clothed and naked human shapes from a single image. *The Visual Computer* 29, 11, 1187-1196.

CHEN, X., ZHOU, B., LU, F., WANG, L., BI, L., AND TAN, P. 2015. Garment modeling with a depth camera. *ACM Transactions on Graphics (TOG)* 34, 6, 203.

CURTIS, S., TAMSTORF, R., AND MANOCHA, D. 2008. Fast collision detection for deformable models using representative-triangles. In *Proceedings of the 2008 symposium on Interactive 3D graphics and games*. ACM, 61-69.

DECAUDIN, P., JULIUS, D., WITHER, J., BOISSIEUX, L., SHEFFER, A., AND CANI, M.-P. 2006. Virtual garments: A fully geometric approach for clothing design. In *Computer Graphics Forum*. Vol. 25. Wiley Online Library, 625-634.

ENGLISH, E. AND BRIDSON, R. 2008. Animating developable surfaces using nonconforming elements. In *ACM Transactions on Graphics (TOG)*. Vol. 27. ACM, 66.

FARABET, C., COUPRIE, C., NAJMAN, L., AND LECUN, Y. 2013. Learning hierarchical features for scene labeling. In *Pattern Analysis and Machine Intelligence*.

FASHIONABLESHOES. 2013. http://bestfashionableshoess.blogspot.com.

FASHIONUNITED. 2016. Global fashion industry statistics—international apparel.

GOLDENTHAL, R., HARMON, D., FATTAL, R., BERCOVIER, M., AND GRINSPUN, E. 2007. Efficient simulation of inextensible cloth. *ACM Transactions on Graphics (TOG)* 26, 3, 49.

GOVINDARAJU, N. K., KABUL, I., LIN, M. C., AND MANOCHA, D. 2007. Fast continuous collision detection among deformable models using graphics processors. *Computers & Graphics* 31, 1, 5-14.

HASLER, N., ASBACH, M., ROSENHAHN, B., OHM, J.-R., AND SEIDEL, H.-P. 2006. Physically based tracking of cloth. In *Proc. of the International Workshop on Vision, Modeling, and Visualization, VMV.* 49-56.

HASLER, N., STOLL, C., SUNKEL, M., ROSENHAHN, B., AND SEIDEL, H.-P. 2009. A statistical model of human pose and body shape. In *Computer Graphics Forum*. Vol. 28. Wiley Online Library, 337-346.

HILLSWEDDINGDRESS. 2015. http://hillsweddingdress.xyz.

HOUSE, D. H. AND BREEN, D. E. 2000. *Cloth modeling and animation*. AK Peters.

IGARASHI, T., MOSCOVICH, T., AND HUGHES, J. F. 2005. As-rigid-as-possible shape manipulation. In *ACM transactions on Graphics (TOG)*. Vol. 24. ACM, 1134-1141.

JANCOSEK, M. AND PAJDLA, T. 2011. Multi-view reconstruction preserving weakly-supported surfaces. In *Computer Vision and Pattern Recognition (CVPR), 2011 IEEE Conference on.* 3121-3128.

JEONG, M.-H., HAN, D.-H., AND KO, H.-S. 2015. Garment capture from a photograph. *Computer Animation and Virtual Worlds* 26, 3-4, 291-300.

KAVAN, L., SLOAN, P.-P., AND O'SULLIVAN, C. 2010. Fast and efficient skinning of animated meshes. In *Computer Graphics Forum*. Vol. 29. Wiley Online Library, 327-336.

KENNEDY, J. 2010. Particle swarm optimization. In *Encyclopedia of Machine Learning*. Springer, 760-766.

LEVIN, A., LISCHINSKI, D., AND WEISS, Y. 2008. A closed-form solution to natural image matting. *Pattern Analysis and Machine Intelligence, IEEE Transactions on* 30, 2, 228-242.

LI, H., LUO, L., VLASIC, D., PEERS, P., POPOVIĆ, J., PAULY, M., AND RUSINKIEWICZ, S. 2012. Temporally coherent completion of dynamic shapes. *ACM Transactions on Graphics* 31, 1 (January).

LI, H., SUMNER, R. W., AND PAULY, M. 2008. Global correspondence optimization for non-rigid registration of depth scans. In *Computer graphics forum*. Vol. 27. Wiley Online Library, 1421-1430.

LI, Y., SUN, J., TANG, C.-K., AND SHUM, H.-Y. 2004. Lazy snapping. In *ACM Transactions on Graphics (ToG)*. Vol. 23. ACM, 303-308.

LINDNER, M. 2015. Global e-commerce sales set to grow 25% in 2015. https://www.internetretailer.com/2015/07/29/global-e-commerceset-grow-25-2015.

LIU, D. C. AND NOCEDAL, J. 1989. On the limited memory bfgs method for large scale optimization. *Mathematical programming* 45, 1-3, 503-528.

LONG, J., SHELHAMER, E., AND DARRELL, T. 2015. Fully convolutional networks for semantic segmentation. *CVPR* (to appear).

MENG, Y., WANG, C. C., AND JIN, X. 2012. Flexible shape control for automatic resizing of apparel products. *Computer-Aided Design* 44, 1, 68-76.

MODCLOTH. 2015. http://www.modcloth.com.

MOESLUND, T. B., HILTON, A., AND KRUGER", V. 2006. A survey of advances in vision-based human motion capture and analysis. *Computer vision and image understanding* 104, 2, 90-126.

NAGANO, K., FYFFE, G., ALEXANDER, O., BARBIÇ., J., LI, H., GHOSH, A., AND DEBEVEC, P. 2015. Skin microstructure deformation with displacement map convolution. *ACM Trans. Graph.* 34, 4 (July), 109:1-109:10.

NARAIN, R., SAMII, A., AND O'BRIEN, J. F. 2012. Adaptive anisotropic remeshing for cloth simulation. *ACM Transactions on Graphics (TOG)* 31, 6, 152.

N G, H. N. AND GRIMSDALE, R. L. 1996. Computer graphics techniques for modeling cloth. *Computer Graphics and Applications, IEEE* 16, 5, 28-41.

PINHEIRO, P. H. AND COLLOBERT, R. 2014. Recurrent convolutional neural networks for scene labeling. In *ICML*.

POPA, T., ZHOU, Q., BRADLEY, D., KRAEVOY, V., FU, H., SHEFFER, A., AND HEIDRICH, W. 2009. Wrinkling captured garments using spacetime data-driven deformation. In *Computer Graphics Forum*. Vol. 28. Wiley Online Library, 427-435.

PROTOPSALTOU, D., LUIBLE, C., AREVALO, M., AND MAGNENAT-THALMANN, N. 2002. *A body and garment creation method for an Internet based virtual fitting room*. Springer.

REDBUBBLE. 2015. http://www.redbubble.com.

ROBSON, C., MAHARIK, R., SHEFFER, A., AND CARR, N. 2011. Context-aware garment modeling from sketches. *Computers & Graphics* 35, 3, 604-613.

ROHMER, D., POPA, T., CANI, M.-P., HAHMANN, S., AND SHEFFER, A. 2010. Animation wrinkling: augmenting coarse cloth simulations with realistic-looking wrinkles. In *ACM Transactions on Graphics (TOG)*. Vol. 29. ACM, 157.

SAACLOTHES. 2015. http://www.saaclothes.com.

SCHOLZ, V. AND MAGNOR, M. 2006. Texture replacement of garments in monocular video sequences. In *Proceedings of the 17th Eurographics conference on Rendering Techniques*. Eurographics Association, 305-312.

SCHOLZ, V., STICH, T., KECKEISEN, M., WACKER, M., AND MAGNOR, M. 2005. Garment motion capture using color-coded patterns. In *Computer Graphics Forum*. Vol. 24. Wiley Online Library, 439-447.

SEO, H. AND MAGNENAT-THALMANN, N. 2003. An automatic modeling of human bodies from sizing parameters. In *Proceedings of the 2003 symposium on Interactive 3D graphics*. ACM, 19-26.

SIGAL, L., MAHLER, M., DIAZ, S., MCINTOSH, K., CARTER, E., RICHARDS, T., AND HODGINS, J. 2015. A perceptual control space for garment simulation. *ACM Transactions on Graphics (TOG)* 34, 4, 117.

SUMNER, R. W. AND POPOVIC, J. 2004. Deformation transfer for triangle meshes. *ACM Transactions on Graphics (TOG)* 23, 3, 399-405.

TANG, M., CURTIS, S., YOON, S.-E., AND MANOCHA, D. 2009. Iccd: Interactive continuous collision detection between deformable models using connectivity-based culling. *Visualization and Computer Graphics, IEEE Transactions on* 15, 4, 544-557.

TANIE, H., YAMANE, K., AND NAKAMURA, Y. 2005. High marker density motion capture by retroreflective mesh suit. In *Robotics and Automation, 2005. ICRA 2005. Proceedings of the 2005 IEEE International Conference on*. IEEE, 2884-2889.

TAUBIN, G. 1995. A signal processing approach to fair surface design. In *Proceedings of the 22Nd Annual Conference on Computer Graphics and Interactive Techniques*. SIGGRAPH 95. ACM, New York, N.Y., USA, 351-358.

TAYLOR, C. J. 2000. Reconstruction of articulated objects from point correspondences in a single uncalibrated image. In *Computer Vision and Pattern Recognition, 2000. Proceedings. IEEE Conference on*. Vol. 1. IEEE, 677-684.

THOMASZEWSKI, B., PABST, S., AND STRASSER, W. 2009. Continuum-based strain limiting. In *Computer Graphics Forum*. Vol. 28. Wiley Online Library, 569-576.

TURQUIN, E., WITHER, J., BOISSIEUX, L., CANI, M.-P., AND HUGHES, J. F. 2007. A sketch-based interface for clothing virtual characters. *IEEE Computer Graphics and Applications* 1, 72-81.

VOLINO, P. AND MAGNENAT-THALMANN, N. 1999. Fast geometrical wrinkles on animated surfaces. *In Seventh International Conference in Central Europe on Computer Graphics and Visualization (Winter School on Computer Graphics)*.

WANG, C. C., WANG, Y., AND YUEN, M. M. 2005. Design automation for customized apparel products. *Computer-Aided Design* 37, 7, 675-691.

WANG, H., O'BRIEN, J., AND RAMAMOORTHI, R. 2010. Multi-resolution isotropic strain limiting. In *ACM Transactions on Graphics (TOG)*. Vol. 29. ACM, 156.

WANG, H., O'BRIEN, J. F., AND RAMAMOORTHI, R. 2011. Data-driven elastic models for cloth: modeling and measurement. *ACM Transactions on Graphics (TOG)* 30, 4, 71.

WEIL, J. 1986. The synthesis of cloth objects. *ACM Siggraph Computer Graphics* 20, 4, 49-54.

WHITE, R., CRANE, K., AND FORSYTH, D. A. 2007. Capturing and animating occluded cloth. In *ACM Transactions on Graphics (TOG)*. Vol. 26. ACM, 34.

W U, C. 2011. Visualsfm: A visual structure from motion system. URL: http://homes.cs. washington.edu/~ccwu/vsfm9.

WU, C. 2013. Towards linear-time incremental structure from motion. In *3D Vision—3DV 2013, 2013 International Conference on*. 127-134.

XIE, S. AND TU, Z. 2015. Holistically-nested edge detection. In *Proceedings of the IEEE International Conference on Computer Vision*. 1395-1403.

YAMAGUCHI, K., KIAPOUR, M. H., AND BERG, T. 2013. Paper doll parsing: Retrieving similar styles to parse clothing items. In *Computer Vision (ICCV), 2013 IEEE International Conference on*. IEEE, 3519-3526.

YANG, Y., Y U, Y., ZHOU, Y., DU, S., DAVIS, J., AND YANG, R. 2014. Semantic parametric reshaping of human body models. In *3D Vision (3DV), 2014 2nd International Conference on*. Vol. 2. IEEE, 41-48.

Y E, M., WANG, H., DENG, N., YANG, X., AND YANG, R. 2014. Realtime human pose and shape estimation for virtual try-on using a single commodity depth camera. *IEEE transactions on visualization and computer graphics* 20, 4, 550-559.

YOUNG, S., ADELSTEIN, B., AND ELLIS, S. 2007. Calculus of nonrigid surfaces for geometry and texture manipulation. *Visualization and Computer Graphics, IEEE Transactions on* 13, 5, 902-913.

ZHAO, W., CHELLAPPA, R., PHILLIPS, P. J., AND ROSENFELD, A. 2003. Face recognition: A literature survey. *ACM computing surveys (CSUR)* 35, 4, 399-458.

ZHOU, B., CHEN, X., FU, Q., GUO, K., AND TAN, P. 2013. Garment modeling from a single image. In *Computer Graphics Forum*. Vol. 32. Wiley Online Library, 85-91.

ZHOU, S., F U, H., LIU, L., COHEN-OR, D., AND HAN, X. 2010. Parametric reshaping of human bodies in images. In *ACM Transactions on Graphics (TOG)*. Vol. 29. ACM, 126.

It is understood that various details of the presently disclosed subject matter may be changed without departing from the scope of the presently disclosed subject matter. Furthermore, the foregoing description is for the purpose of illustration only, and not for the purpose of limitation

What is claimed is:

1. A method for modeling garments using single view images, the method comprising:
   receiving an image depicting a person wearing at least one garment;
   constructing a body model based on the person in the image and a template from a body model database;
   constructing at least one garment model based on the at least one garment in the image and at least one template from a garment model database, wherein constructing the at least one garment model includes computing at least one average wrinkle density for the at least one garment and using the at least one average wrinkle density and a physics-based cloth simulation to derive garment material properties of the at least one garment model, wherein using the at least one average wrinkle density and a physics-based cloth simulation to derive the garment material properties of the at least one garment model includes determining a first reference garment based on a first average wrinkle density and using detected garment information about the first garment from the image and known garment material properties associated with the first reference garment to derive the garment material properties of the at least one garment model;
   constructing a combined model based on the body model and the at least one garment model; and
   adjusting the combined model by modifying body pose parameters and the garment material properties and sizing parameters.

2. The method of claim 1 comprising:
   prior to constructing the body model:
      receiving a body outline associated with the person in the image; and
      identifying multiple human body joint locations in the image.

3. The method of claim 2 wherein the body outline or the multiple human body joint locations is provided by a user.

4. The method of claim 2 wherein the body outline or the multiple human body joint locations is determined automatically using image processing.

5. The method of claim 1 wherein constructing the body model includes determining a human body shape and a body pose for the image.

6. The method of claim 1 wherein constructing the at least one garment model includes estimating locations and types of garments in the image, using a database of garment patterns and/or templates.

7. The method of claim 1 wherein constructing the combined model includes aligning the at least one garment model and the body model based on joint related information for the body model and the at least one garment model.

8. The method of claim 1 wherein adjusting the combined model includes using at least one iterative process and the physics-based cloth simulation for adjusting garment sizing information, the garment material properties, and the body pose parameters.

9. A system for modeling garments using single view images, the system comprising:
   at least one processor; and
   a garment recovery module (GRM) implemented using the at least one processor, the GRM is configured for:
      receiving an image depicting a person wearing at least one garment;
      constructing a body model based on the person in the image and a template from a body model database;
      constructing at least one garment model based on the at least one garment in the image and at least one template from a garment model database, wherein constructing the at least one garment model includes computing at least one average wrinkle density for the at least one garment and using the at least one average wrinkle density and a physics-based cloth simulation to derive garment material properties of the at least one garment model, wherein using the at least one average wrinkle density and a physics-based cloth simulation to derive the garment material properties of the at least one garment includes determining a first reference garment based on a first average wrinkle density and using detected garment information about the first garment from the image and known garment material properties associated with the first reference garment to derive the garment material properties of the at least one garment model;
      constructing a combined model based on the body model and the at least one garment model; and
      adjusting the combined model by modifying body pose parameters and the garment material properties and sizing parameters.

10. The system of claim 9 wherein the GRM is configured for:
    prior to constructing the body model:
       receiving a body outline associated with the person in the image; and
       identifying multiple human body joint locations in the image.

11. The system of claim 10 wherein the body outline or the multiple human body joint locations is provided by a user.

12. The system of claim 10 wherein the body outline or the multiple human body joint locations is determined automatically using image processing.

13. The system of claim 9 wherein the GRM is configured for determining a human body shape and a body pose for the image.

14. The system of claim 9 wherein the GRM is configured for estimating locations and types of garments in the image.

15. The system of claim 9 wherein the GRM is configured for aligning the at least one garment model and the body model based on joint related information for the body model and the at least one garment model.

16. The system of claim 9 wherein the GRM is configured for at least one iterative process and the physics-based cloth simulation for adjusting and calculating garment sizing information, the garment material properties, and the body pose parameters.

17. A non-transitory computer readable medium storing executable instructions that, when executed by one or more computers cause the one or more computers to perform operations comprising:
  receiving an image depicting a person wearing at least one garment;
  constructing a body model based on the person in the image and a template from a body model database;
  constructing at least one garment model based on the at least one garment in the image and at least one template from a garment model database;
  constructing a combined model based on the body model and the at least one garment model, wherein constructing the at least one garment model includes computing at least one average wrinkle density for the at least one garment and using the at least one average wrinkle density and a physics-based cloth simulation to derive garment material properties of the at least one garment model, wherein using the at least one average wrinkle density and a physics-based cloth simulation to derive the garment material properties of the at least one garment model includes determining a first reference garment based on a first average wrinkle density and using detected garment information about the first garment from the image and known garment material properties associated with the first reference garment to derive the garment material properties of the at least one garment model; and
  adjusting the combined model by modifying body pose parameters and the garment material properties and sizing parameters.

18. The non-transitory computer readable medium of claim 17, the operations comprising:
  prior to constructing the body model:
    receiving body outline associated with the person in the image; and
    identifying multiple human body joint locations in the image.

\* \* \* \* \*